(12) United States Patent
Nishimura et al.

(10) Patent No.: US 12,522,907 B2
(45) Date of Patent: Jan. 13, 2026

(54) OUTER PLATE COMPONENT FOR AUTOMOBILE, BLANK SHEET, MANUFACTURING METHOD FOR BLANK SHEET, AND MANUFACTURING FACILITY FOR BLANK SHEET

(71) Applicant: NIPPON STEEL CORPORATION, Tokyo (JP)

(72) Inventors: Ryuichi Nishimura, Tokyo (JP); Yasuhiro Ito, Tokyo (JP); Yasunori Sawa, Tokyo (JP); Koichi Hamada, Tokyo (JP); Satoshi Hironaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 20 days.

(21) Appl. No.: 18/579,354

(22) PCT Filed: Aug. 27, 2021

(86) PCT No.: PCT/JP2021/031495
§ 371 (c)(1),
(2) Date: Jan. 14, 2024

(87) PCT Pub. No.: WO2023/026469
PCT Pub. Date: Mar. 2, 2023

(65) Prior Publication Data
US 2024/0352565 A1    Oct. 24, 2024

(51) Int. Cl.
*C22C 38/60* (2006.01)
*B21D 28/26* (2006.01)
(Continued)

(52) U.S. Cl.
CPC .............. *C22C 38/60* (2013.01); *B21D 28/26* (2013.01); *C21D 6/002* (2013.01); *C21D 6/004* (2013.01);
(Continued)

(58) Field of Classification Search
CPC ..... C22C 38/60; C22C 38/001; C22C 38/002; C22C 38/005; C22C 38/008; C22C 38/02;
(Continued)

(56) References Cited

U.S. PATENT DOCUMENTS

2015/0209848 A1* 7/2015 Kopplin ............. B23K 26/0823
428/659

FOREIGN PATENT DOCUMENTS

CN    103586353 A    2/2014
CN    106964722 A    7/2017
(Continued)

*Primary Examiner* — Katherine A Christy
(74) *Attorney, Agent, or Firm* — Renner, Otto, Boisselle & Sklar, LLP

(57) ABSTRACT

A blank sheet which is a material for an outer plate component for an automobile includes a steel sheet. A rolling direction of the steel sheet extends along a longitudinal direction of the blank sheet, and a thickness is 0.6 mm or less. The steel sheet may have a chemical composition in which arithmetic average waviness Wa is 0.10 to 0.30 μm. The steel sheet may have a chemical composition in which $\Delta C$ calculated from $C_{20}$ that is a C content at a depth position of 20 μm from a surface, $C_{60}$ that is a C content at a depth position of 60 μm from the surface, and Expression (1) is 0.20 to 0.90 mass %/mm, and a tensile strength is 500 MPa or greater, $$\Delta C = (C_{60} - C_{20})/(0.04) \qquad (1).$$

2 Claims, 2 Drawing Sheets

(51) Int. Cl.
- C21D 6/00 (2006.01)
- C21D 8/02 (2006.01)
- C21D 9/46 (2006.01)
- C22C 38/00 (2006.01)
- C22C 38/02 (2006.01)
- C22C 38/04 (2006.01)
- C22C 38/06 (2006.01)
- C22C 38/12 (2006.01)
- C22C 38/14 (2006.01)
- C22C 38/20 (2006.01)
- C22C 38/22 (2006.01)
- C22C 38/24 (2006.01)
- C22C 38/26 (2006.01)
- C22C 38/28 (2006.01)
- C22C 38/32 (2006.01)
- C22C 38/38 (2006.01)
- C22C 38/44 (2006.01)
- C22C 38/50 (2006.01)
- C22C 38/54 (2006.01)
- C22C 38/58 (2006.01)

(52) U.S. Cl.
CPC ............ *C21D 6/005* (2013.01); *C21D 6/008* (2013.01); *C21D 8/0205* (2013.01); *C21D 8/021* (2013.01); *C21D 8/0226* (2013.01); *C21D 8/0236* (2013.01); *C21D 8/0263* (2013.01); *C21D 8/0278* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/44* (2013.01); *C22C 38/50* (2013.01); *C22C 38/54* (2013.01); *C22C 38/58* (2013.01)

(58) Field of Classification Search
CPC ......... C22C 38/04; C22C 38/06; C22C 38/14; C22C 38/20; C22C 38/22; C22C 38/24; C22C 38/38; C22C 38/44; C22C 38/50; C22C 38/54; C22C 38/58
USPC ........................................................ 428/544
See application file for complete search history.

(56) References Cited

FOREIGN PATENT DOCUMENTS

| | | |
|---|---|---|
| JP | 02-030306 A | 1/1990 |
| JP | 2003-105512 A | 4/2003 |
| JP | 2017-002333 A | 1/2017 |
| WO | 98/55246 A1 | 12/1998 |

\* cited by examiner

VEHICLE BODY FRONT-BACK DIRECTION
VEHICLE BODY WIDTH DIRECTION

STRAIN RATIO ($e_x/e_y$)

VEHICLE BODY HEIGHT DIRECTION
VEHICLE BODY WIDTH DIRECTION

OUTER PLATE COMPONENT FOR AUTOMOBILE, BLANK SHEET, MANUFACTURING METHOD FOR BLANK SHEET, AND MANUFACTURING FACILITY FOR BLANK SHEET

TECHNICAL FIELD OF THE INVENTION

The present invention relates to an outer plate component for an automobile, a blank sheet, a manufacturing method for the blank sheet, and a manufacturing facility for the blank sheet.

BACKGROUND ART

From the viewpoint of global environment protection, automobile bodies are required to be lightweight and to have improved collision safety. In order to meet these demands, high-strengthening and thinning of panel-related components such as door outers are also being considered. Unlike frame components, these panel-related components are visible to the public, and thus require high appearance quality. Therefore, even high strength steel sheets, which have been applied as frame components in the related art, are required to have high appearance quality when applied as panel-related components.

As a technique for improving the appearance quality, for example, Patent Document 1 discloses a metal sheet with excellent surface properties rolled by a rolling roll which has a pattern of a large number of minute protrusions and recesses formed on the whole of at least one surface by irradiation with high energy density beams, in which a microscopic structure of the metal sheet surface consists of recessed parts formed by transferring protruding parts of the roll and relatively flat parts other than the recessed parts, an area ratio of the flat parts is 0.6 or greater, a distribution density of the recessed parts is 8 pieces/mm$^2$ or greater, and a flat part length ratio is 0.9 or less in any direction. The technique described in Patent Document 1 is for making a reflected image clearer when an image is projected on a coating film surface of a coated steel sheet.

In addition, in general, panel-related components are manufactured by press-forming a blank sheet blanked from a rolled steel sheet. As a blanking method, for example, Patent Document 2 discloses a method in which of a resin-coated metal sheet obtained by coating a metal sheet that is both rolled and long with a resin film, a hexagon in which two sides facing each other are substantially parallel to each other is defined as a basic shape, and a blank having a shape in which each corner part at the periphery of the hexagon is formed in an arc shape is punched so that a pair of two sides of the hexagon, facing each other and substantially parallel to each other, forms an angle of 80° to 100° with the rolling direction of the resin-coated metal sheet.

PRIOR ART DOCUMENT

Patent Document

[Patent Document 1] Japanese Unexamined Patent Application, First Publication No. H2-30306
[Patent Document 2] PCT International Publication No. WO98/055246

Suppressing the occurrence of ghost lines is one of the challenges for the improvement in appearance quality. Ghost lines are a stripe pattern which is visually recognized by the generation of, in the press forming of a steel sheet having a hard phase and a soft phase, minute protrusions and recesses of 1 mm-order in streaks on a surface due to the preferential deformation of the periphery of the soft phase. Since ghost lines are a pattern which can be unintentionally generated, a press-formed article in which the ghost lines are generated is inferior in appearance quality. Therefore, it is important to suppress the occurrence of the ghost lines in order to improve the appearance quality.

However, the technique described in Patent Document 1 is for making a reflected image clearer when an image is projected on a coating film surface of a coated steel sheet, and does not consider ghost lines. Therefore, the technique described in Patent Document 1 has room for improvement.

DISCLOSURE OF THE INVENTION

Problems to be Solved by the Invention

The present invention has been made in view of the above circumstances. An object of the present invention is to provide an outer plate component for an automobile in which ghost lines are reduced, a blank sheet in which ghost lines occurring by press forming can be reduced, a manufacturing method for the blank sheet, and a manufacturing facility for the blank sheet.

Means for Solving the Problem

The present inventors have conducted intensive studies on the influence of the press forming on the presence or absence of ghost lines, and found that the presence or absence and the degree of the occurrence of ghost lines change depending on the deformation style of a blank sheet during press forming. Specifically, the present inventors have found that, as a deformation style in which a rolled steel sheet which is a material for a blank sheet is strongly pulled in a sheet width direction is made, ghost lines are likely to occur and ghost lines having a large line width are likely to occur.

The gist of the present invention made on the basis of the above-mentioned findings is as follows.

[1] An outer plate component for an automobile according to an aspect of the present invention is an outer plate component for an automobile, including a steel sheet, in which a rolling direction of the steel sheet extends along a vehicle body left-right direction in a plan view.

[2] In the outer plate component for an automobile according to [1], a final yield stress may be 400 MPa or greater.

[3] In the outer plate component for an automobile according to [1] or [2], the steel sheet may contain, as a chemical composition, by mass %,
C: 0.040% to 0.105%,
Mn: 1.00% to 2.30%,
Si: 0.005% to 1.500%,
Al: 0.005% to 0.700%,
P: 0.100% or less,
S: 0.0200% or less.
N: 0.0150% or less,
O: 0.0100% or less,
Cr: 0% to 0.80%,
Mo: 0% to 0.16%,
B: 0% to 0.0100%,
Ti: 0% to 0.100%,
Nb: 0% to 0.060%,
V: 0% to 0.50%.
Ni: 0% to 1.00%,
Cu: 0% to 1.00%, W: 0% to 1.00%,
Sn: 0% to 1.00%,
Sb: 0% to 0.200%.
Ca: 0% to 0.0100%,
Mg: 0% to 0.0100%,
Zr: 0% to 0.0100%,
REM: 0% to 0.0100%, and
a remainder: Fe and impurities.

[4] A blank sheet according to another aspect of the present invention is a blank sheet which is a material for an outer plate component for an automobile,
the blank sheet including a steel sheet, in which a rolling direction of the steel sheet extends along a longitudinal direction of the blank sheet, and a thickness is 0.6 mm or less.

[5] In the blank sheet according to [4], the steel sheet may contain, as a chemical composition, by mass %,
C: 0.040% to 0.105%,
Mn: 1.00% to 2.30%,
Si: 0.005% to 1.500%,
Al: 0.005% to 0.700%,
P: 0.100% or less,
S: 0.0200% or less,
N: 0.0150% or less,
O: 0.0100% or less,
Cr: 0% to 0.80%,
Mo: 0% to 0.16%,
B: 0% to 0.0100%,
Ti 0% to 0.100%,
Nb: 0% to 0.060%,
V: 0% to 0.50%,
Ni: 0% to 1.00%,
Cu: 0% to 1.00%,
W: 0% to 1.00%,
Sn: 0% to 1.00%,
Sb: 0% to 0.200%,
Ca: 0% to 0.0100%,
Mg: 0% to 0.0100%,
Zr: 0% to 0.0100%,
REM: 0% to 0.0100%, and
a remainder: Fe and impurities.

[6] In the blank sheet according to [4] or [5], the steel sheet may contain, as a chemical composition, by mass %,
C: 0.040% to 0.100%,
Mn: 1.00% to 2.00%,
Si: 0.005% to 1.500%,
P: 0.100% or less,
S: 0.0200% or less,
Al: 0.005% to 0.700%,
N: 0.0150% or less,
O: 0.0100% or less,
Cr: 0% to 0.80%,
Mo: 0% to 0.16%,
B: 0% to 0.0100%,
Ti: 0% to 0.100%,
Nb: 0% to 0.060%,
V: 0% to 0.50%,
Ni: 0% to 1.00%,
Cu: 0% to 1.00%,
W: 0% to 1.00%,
Sn: 0% to 1.00%,
Sb: 0% to 0.200%,
Ca: 0% to 0.0100%,
Mg: 0% to 0.0100%,
Zr: 0% to 0.0100%,
REM: 0% to 0.0100%, and
a remainder: Fe and impurities, and
arithmetic average waviness Wa may be 0.10 to 0.30 µm.

[7] In the blank sheet according to [4] or [5], the steel sheet may contain, as a chemical composition, by mass %,
C: 0.040% to 0.105%,
Mn: 1.00% to 2.30%,
Si: 0.005% to 1.500%,
Al: 0.005% to 0.700%,
P: 0.100% or less,
S: 0.0200% or less,
N: 0.0150% or less,
O: 0.0100% or less,
Cr: 0% to 0.80%,
Mo: 0% to 0.16%.
Ti: 0% to 0.100%,
B: 0% to 0.0100%,
Nb: 0% to 0.060%,
V: 0% to 0.50%,
Ni: 0% to 1.00%,
Cu: 0% to 1.00%,
W: 0% to 1.00%,
Sn: 0% to 1.00%,
Sb: 0% to 0.200%,
Ca: 0% to 0.0100%,
Mg: 0% to 0.0100%,
Zr: 0% to 0.0100%,
REM: 0% to 0.0100%, and
a remainder: Fe and impurities.
$\Delta C$ calculated from $C_{20}$ that is a C content at a depth position of 20 µm from a surface, $C_{60}$ that is a C content at a depth position of 60 µm from the surface, and Expression (1) may be 0.20 to 0.90 mass %/mm, and the tensile strength may be 500 MPa or greater.

[8] A manufacturing method for a blank sheet according to a further aspect of the present invention is a manufacturing method for a blank sheet including a steel sheet, the method including blanking the steel sheet so that a rolling direction of the steel sheet extends along a longitudinal direction of the blank sheet.

[9] In the manufacturing method for a blank sheet according to [8], in the blanking, the steel sheet may be blanked in an alternating manner.

[10] A manufacturing facility for a blank sheet according to a still further aspect of the present invention is a manufacturing facility for a blank sheet, the facility including a blanking device having a shear which cuts out a blank sheet from a steel sheet or a die and punch which punches the blank sheet from the steel sheet,
in which the blanking device blanks the steel sheet so that the rolling direction of the steel sheet extends along a longitudinal direction of the blank sheet.

Effects of the Invention

According to the present invention, it is possible to provide an outer plate component for an automobile in which ghost lines are reduced, a blank sheet in which ghost lines occurring by press forming can be reduced, a manufacturing method for the blank sheet, and a manufacturing facility for the blank sheet.

EMBODIMENTS OF THE INVENTION

Figure 1:
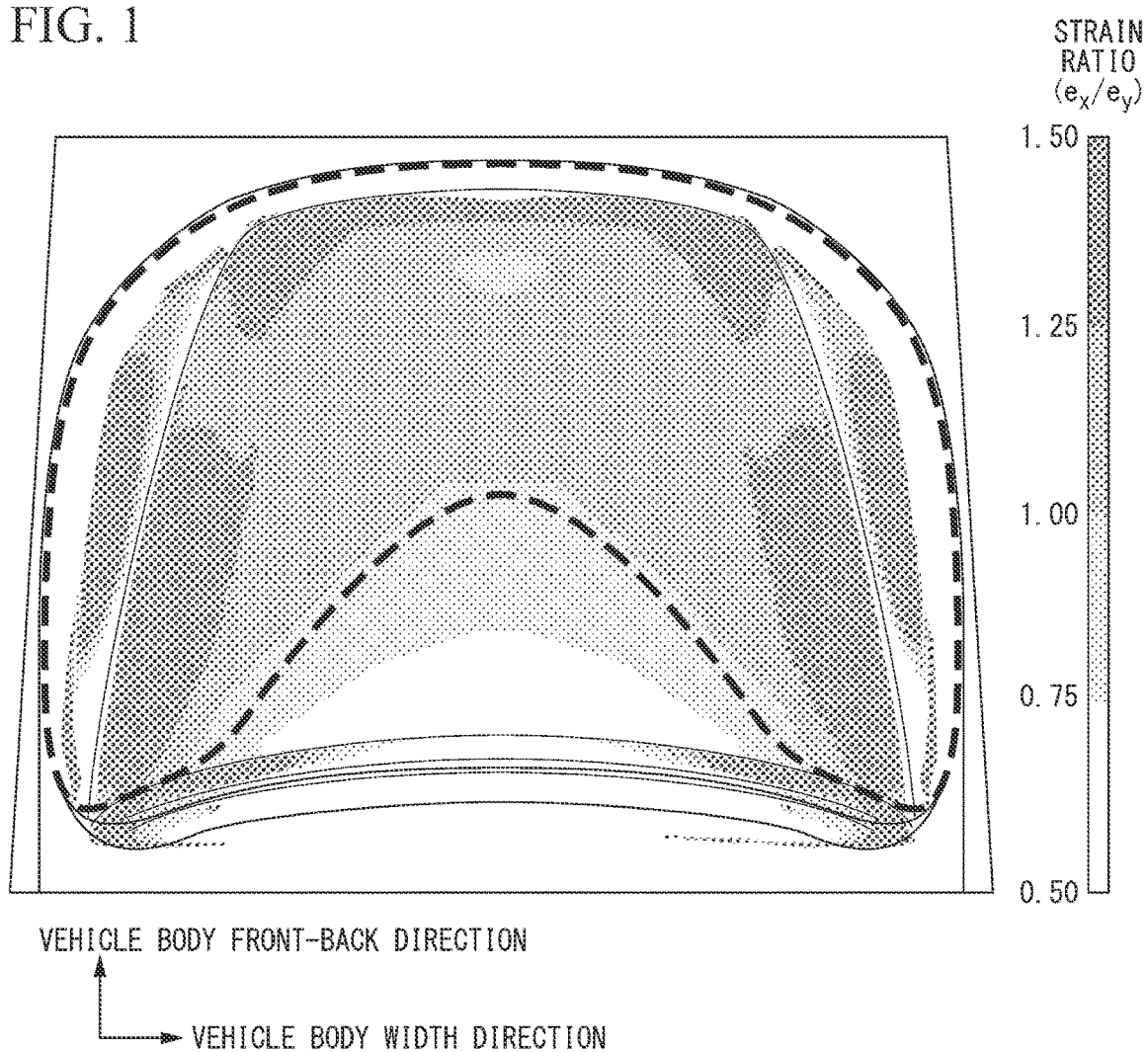
FIG. 1 is a diagram showing the distribution of a strain ratio $e_x/e_y$ which is a ratio of strain $e_x$ in a vehicle body left-right direction to strain $e_y$ in a vehicle body front-back direction of a hood panel of an automobile manufactured by press forming.

Hereinafter, an outer plate component for an automobile according to the present embodiment will be described in detail with reference to FIG. 1. FIG. 1 is a diagram showing the distribution of a strain ratio $e_x/e_y$ which is a ratio of strain $e_x$ in a vehicle body left-right direction to strain $e_y$ in a vehicle body front-back direction of a hood panel of an automobile manufactured by press forming.

The present invention is not limited to the configuration disclosed in the present embodiment, and various modifications can be made without departing from the gist of the present invention.

In the outer plate component for an automobile according to the present embodiment, the rolling direction of a steel sheet extends along the vehicle body left-right direction in a plan view. The outer plate component for an automobile mentioned herein refers to a component which is disposed in the center in the vehicle body left-right direction, and of which the outer shape viewed in a vehicle body up-down direction has a substantially symmetrical shape with respect to a straight line positioned in the center in the vehicle body left-right direction. Specifically, the outer plate component for an automobile is a hood panel, a back door panel, or a trunk lid of an automobile.

The outer plate component for an automobile according to the present embodiment is manufactured by press forming. The present inventors have conducted intensive studies on the influence of the press forming on the presence or absence of ghost lines, and found that the presence or absence and the degree of the occurrence of ghost lines change depending on the deformation style of a blank sheet during press forming. Specifically, the present inventors have found that, as a deformation style in which a rolled steel sheet which is a material for a blank sheet is strongly pulled in a sheet width direction (a direction orthogonal to the rolling direction among directions along the sheet surface) is made, ghost lines are likely to occur and ghost lines having a large line width are likely to occur.

The present inventors speculate the reason for this as follows. Elements such as Mn are segregated during the course of solidification of steel in the manufacturing of a rolled steel sheet which is a material for a blank sheet, and the segregated parts extend in the rolling direction by rolling and form band shapes. In the vicinities of the segregated parts, ferrite is likely to transform into austenite during annealing. The austenite formed during annealing turns into hard martensite after annealing. Therefore, band-like martensite extending in the rolling direction is present in the steel sheet after annealing. The variation in hardness (hardness difference) in the sheet width direction of the steel sheet increases due to the hard martensite (hard phase) and a soft phase other than the martensite (soft phase). It is speculated that in a case where such a steel sheet is strongly pulled in the sheet width direction, the soft phase is preferentially deformed and ghost lines are likely to occur.

Therefore, in a case where the steel sheet is strongly pulled in the rolling direction, preferential deformation of the soft phase hardly occurs, and the occurrence of ghost lines is reduced. Accordingly, in a blank sheet to be press-formed, in a case where the rolling direction of a steel sheet is extended in a direction in which large deformation occurs during processing such as press forming, ghost lines hardly occur in an outer plate component for an automobile.

As a result of finite element method analysis, the present inventors have found that as shown in FIG. 1, the proportion of elements having a strain ratio $e_x/e_y$ of greater than 1.00 is high and regions where the deformation occurs more greatly in a vehicle body left-right direction than in a vehicle body front-back direction are dominant in the hood panel of an automobile produced by press forming. On the basis of such a deformation aspect in the press forming, the present inventors have conducted studies of an outer plate component for an automobile based on the knowledge of the above-described mechanism for the occurrence of ghost lines, and as a result, achieved a technique with which ghost lines can be reduced in the outer plate component for an automobile. That is, in a blank sheet which is used for the outer plate component for an automobile manufactured by press forming, in a case where the rolling direction of the steel sheet extends along the vehicle body left-right direction of the outer plate component for an automobile after press forming, the deformation follows the rolling direction in many regions among regions where large deformation occurs during forming, the preferential deformation of a soft phase is suppressed, and thus ghost lines hardly occur in the outer plate component for an automobile. Examples of the outer plate component for an automobile in which regions where the strain ratio $e_x/e_y$ which is a ratio of strain $e_x$ in the vehicle body left-right direction to strain $e_y$ in the vehicle body front-back direction is large are dominant include a back door panel and a trunk lid in addition to the hood panel of the automobile.

In members (for example, side doors and the like) disposed in pairs on both sides in the vehicle body left-right direction of the automobile, the sheet thickness direction of the steel sheet extends along the vehicle body left-right direction when viewed in a plan view, in other words, in a direction along the vehicle body height direction. Accordingly, the members disposed in pairs on both sides in the vehicle body left-right direction of the automobile are not included in the technical scope of the outer plate component for an automobile according to the present embodiment.

Meanwhile, the members disposed in pairs on both sides in the vehicle body left-right direction of the automobile are included in the technical scope of the following invention having a common technical idea with the outer plate component for an automobile according to the present embodiment. That is, the members disposed in pairs on both sides in the vehicle body left-right direction of the automobile are included in the technical scope of the invention of an outer plate component for an automobile in which the rolling direction of the steel sheet extends along the vehicle body height direction when viewed in a side view, in other words, in a direction along the vehicle body left-right direction.

Both the outer plate component for an automobile according to the present embodiment and the outer plate component for an automobile according to the above invention have the same technical feature that the rolling direction of the steel sheet extends along, among a first direction and a second direction orthogonal to each other along a virtual reference plane corresponding to the arrangement postures of the components when viewed in a direction along the normal line of the virtual reference plane, a direction in which the amount of deformation from a flat sheet (the maximum value of the amount of displacement from the virtual reference plane in the normal direction) generated by press forming is greater. Here, in a case where the outer plate component for an automobile is a hood panel, the vehicle body front-back direction corresponds to the first direction, and the vehicle body left-right direction corresponds to the second direction. The vehicle body left-right direction is the direction in which the amount of deformation from a flat sheet obtained by press forming is greater. In addition, in a case where the outer plate component for an automobile is a side door, the vehicle body front-back direction corresponds to the first direction, and the vehicle body height direction corresponds to the second direction. The vehicle body height direction is the direction in which the amount of deformation from a flat sheet obtained by press forming is greater.

Figure 2:
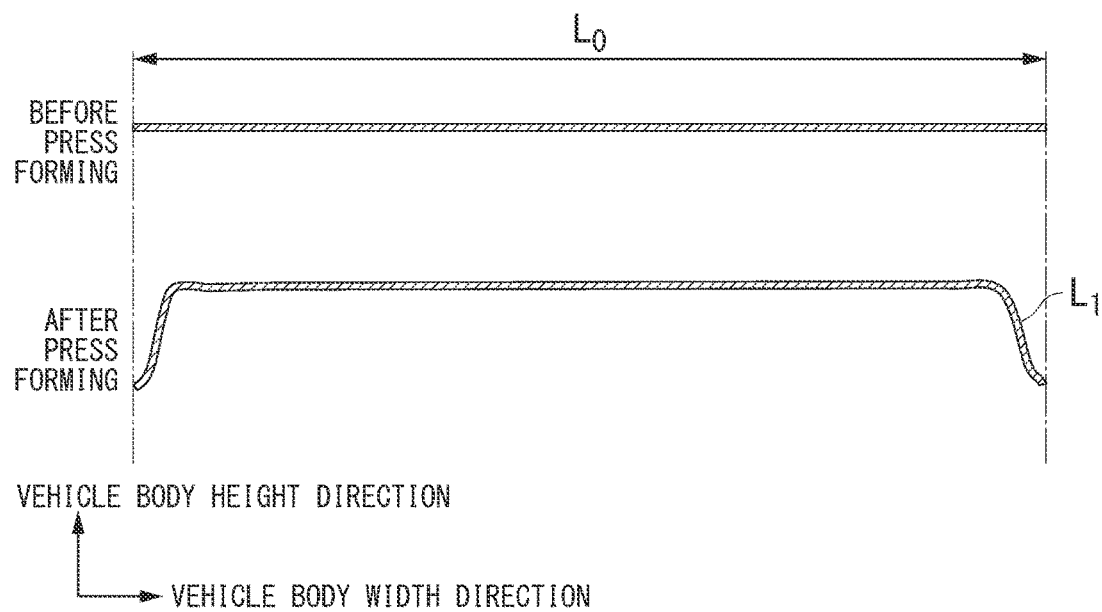
FIG. 2 is a diagram showing cross sections of a blank sheet before press forming and a press-formed article in a direction in which the curvature is small.
Figure 3:
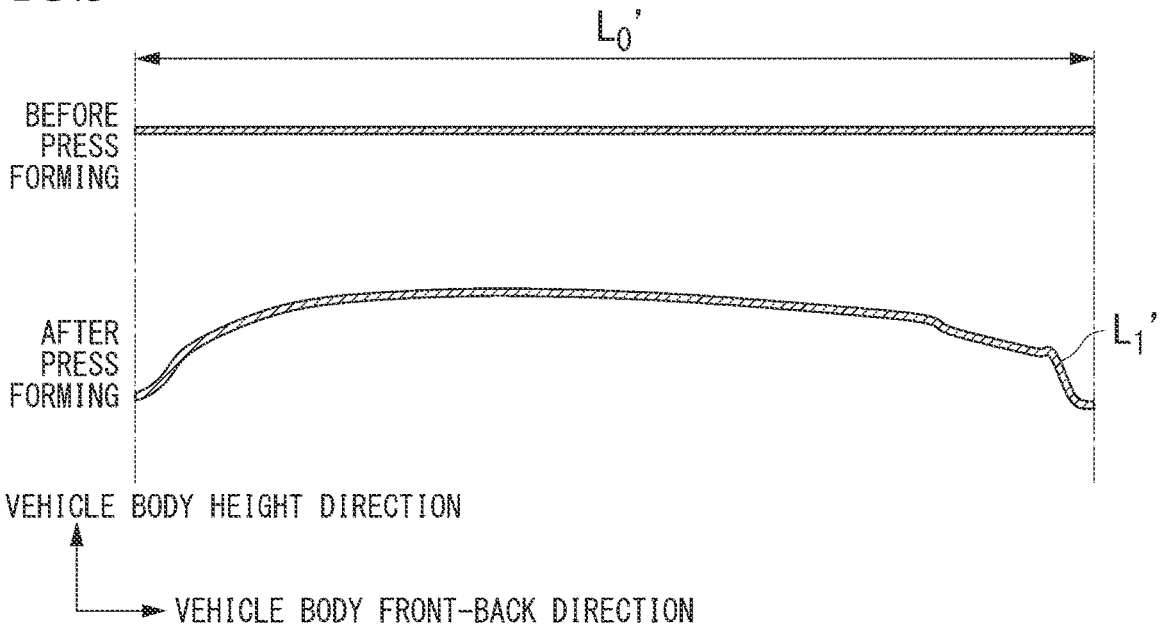
FIG. 3 is a diagram showing cross sections of a blank sheet before press forming and a press-formed article in a direction in which the curvature is large.

Here, the reason why regions where the strain ratio $e_x/e_y$ is large are dominant in the hood panel of an automobile will be described with reference to FIGS. 2 and 3. FIG. 2 is a diagram showing cross sections of a blank sheet before press forming and a press-formed article (blank sheet after press forming) in a direction in which the curvature is small. FIG. 3 is a diagram showing cross sections of a blank sheet before press forming and a press-formed article in a direction in which the curvature is large.

As shown in FIGS. 2 and 3, in the cross section of the press-formed article having a small curvature, the standing walls at both ends have a long length, and a ratio of a line length $L_1$ of the cross section of the press-formed article having a small curvature to a line length $L_0$ of the blank sheet is large. Meanwhile, in the cross section of the press-formed article having a large curvature, the standing walls of the press-formed article have a short length, and a ratio of a line length $L_1'$ of the cross section of the press-formed article having a large curvature to a line length $L_0'$ of the blank sheet is small. In other words, in the direction in which the curvature is small (in FIGS. 2 and 3, FIG. 2), the regions where the strain ratio $e_x/e_y$ is large, generated by press forming, are dominant. In general, in a press-formed article for an automobile such as a hood panel of an automobile, the curvature in a vehicle body left-right direction is smaller than that in a vehicle body front-back direction. Accordingly, regions where the strain ratio $e_x/e_y$ is large are dominant in the hood panel of an automobile. Therefore, in the blank sheet, in a case where the rolling direction of the steel sheet extends along the direction that becomes the vehicle body left-right direction when the blank sheet is used as an outer plate component for an automobile, ghost lines can be reduced.

The rolling direction of the steel sheet in the outer plate component for an automobile can be specified by structure observation. Specifically, cut cross sections obtained by cutting in the vehicle body up-down direction are acquired as samples for structure observation by changing the direction counterclockwise toward the vehicle body front-back direction from the vehicle body left-right direction (=defined as the 0°-direction) to 90°, that is, the vehicle body front-back direction by 15°. Therefore, as samples for structure observation which are cut cross sections, a plurality of samples prepared by cutting out at different angles, each changed by 15° from the 0°-direction to the vehicle body front-back direction (the 90°-direction) are obtained.

The structure of the cut cross section is observed, and the cutting direction of the sample having the largest degree of segregation is defined as the rolling direction. The degree of segregation can be evaluated by photographing a cut cross section after nital corrosion with an optical microscope. The region where the segregation has occurred is observed to be black compared to the region without segregation. Therefore, the degree of segregation can be evaluated at a position where black lines indicating the segregation are present by using the above difference in external appearance. In a direction that is not the rolling direction, black lines indicating segregation are present in the vicinity of the center of the sheet thickness, but no longer observed at positions slightly deviated from the center. Meanwhile, in the rolling direction, black lines are present not only at the center of the sheet thickness but also at positions slightly separated from the center. Therefore, a sample in which black lines indicating the segregation are most widely distributed in the sheet thickness direction, including the center of the sheet thickness, can be specified as the rolling direction. In addition, before coating, the rolling direction may also be specified by observing transfer marks on the surface of the rolling roll.

The rolling direction of the steel sheet is preferably coincident with the vehicle body left-right direction, but may not be necessarily coincident therewith. The rolling direction of the steel sheet may form an angle with the vehicle body left-right direction within a range where ghost lines can be reduced. For example, the angle formed by the rolling direction of the steel sheet and the vehicle body left-right direction is 15° or less. Therefore, the extension of the rolling direction of the steel sheet along the vehicle body left-right direction means that the angle formed by the rolling direction of the steel sheet and the vehicle body left-right direction is 15° or less.

[Final Yield Stress: 400 MPa or Greater]

The yield stress of the outer plate component for an automobile according to the present embodiment is preferably 400 MPa or greater at a time when an automobile is produced through a vehicle assembly step, a coating baking step, and the like. In the following description, the yield stress at a time when an automobile is produced may be referred to as the final yield stress. The higher the strength of the steel sheet, the more likely the ghost lines are to occur. In a blank sheet in which the yield stress at a time when an automobile is produced (the final yield stress) is 400 MPa or greater, the ghost line reduction effect is more remarkably exhibited. In addition, the blank sheet press-formed for an automobile is preferably thin in order to reduce the weight of the vehicle body, but the dent resistance tends to decrease as the thickness of the blank sheet decreases. Even in a case where the thickness is small, excellent dentability can be obtained as long as the yield stress at a time when an automobile is produced is 400 MPa or greater. Accordingly, the final yield stress of the outer plate component for an automobile is preferably 400 MPa or greater. The yield stress at a time when an automobile is produced is more preferably 500 MPa or greater. Meanwhile, the upper limit of the yield stress at a time when an automobile is produced is not particularly limited, but is, for example, 850 MPa from the viewpoint of manufacturability.

The final yield stress can be measured by the following method. That is, tensile test pieces of JIS13B may be cut out from five sample acquisition positions determined as described below in a direction perpendicular to the vehicle body left-right direction, and subjected to a tensile test according to JIS standards to obtain yield stresses (yield points or 0.2% yield stresses), and the yield stresses at the five positions may be arithmetically averaged to obtain the final yield stress. Hereinafter, the sample acquisition position will be described. First, an x-direction and a y-direction of the outer plate component for an automobile are defined. For example, in a hood panel or a trunk lid, the x-direction is a vehicle body left-right direction, and the y-direction is a vehicle body front-back direction. In a back door panel, the x-direction is a vehicle body left-right direction, and the y-direction is a vehicle body up-down direction. In that case, in each component, a maximum value $x_{max}$ and a minimum value $x_{min}$ in the x-direction are defined, and a median value $x_{mid}=(x_{max}+x_{min})/2$, and an x-length $x_{len}=x_{max}-x_{min}$ are calculated. Similarly, a maximum value $y_{max}$ and a minimum value $y_{min}$ in the y-direction, a median value $y_{mid}=(y_{max}+y_{min})/2$, and a y-length $y_{len}=y_{max}-y_{min}$ are obtained. Based on the above results, the sample acquisition positions are defined as follows. That is, the sample acquisition positions are at five points, that is, $(x, y)=(x_{mid}, y_{mid})$, $(x_{mid}+0.2\times x_{len}, y_{mid}+0.2\times y_{len})$, $(x_{mid}-0.2\times x_{len}, y_{mid}-0.2\times y_{len})$, $(x_{mid}+0.2\times x_{len}, y_{mid}-0.2\times y_{len})$, and $(x_{mid}-0.2\times x_{len}, y_{mid}+0.2\times y_{len})$.

[Chemical Composition]

The chemical composition of a base steel sheet constituting the outer plate component for an automobile according to the present embodiment will be described. The numerical limit range described below with "to" in between includes the lower limit and the upper limit. Numerical values indicated as "less than" or "greater than" do not fall within the numerical range. In the following description, % regarding the chemical composition is mass % unless otherwise specified. The base steel sheet constituting the outer plate component for an automobile corresponds to the steel sheet of the outer plate component for an automobile according to the present invention.

C: 0.040% to 0.105%

C is an element which increases the strength. In order to obtain a desired strength, the C content is preferably 0.040% or greater. In order to further increase the strength, the C content may be 0.045% or greater, 0.050% or greater, 0.060% or greater, or 0.070% or greater.

Meanwhile, the C content is preferably 0.105% or less. In a case where the C content is 0.105% or less, the C content is reduced after decarburization annealing, and the occurrence of an excessive hardness difference is suppressed in a decarburized layer formed in the vicinity of the surface. As a result, the occurrence of ghost lines in the outer plate component for an automobile can be further reduced. Furthermore, in a case where the C content is 0.100% or less, the diffusion of Mn is promoted during solidification and the tendency for Mn to segregate in band shapes can be reduced. As a result, it is possible to reduce the ghost lines of the outer plate component for an automobile. Accordingly, the C content is more preferably 0.100% or less. From the viewpoint of reducing ghost lines, the C content may be 0.095% or less or 0.090% or less. In addition, from the viewpoint of suppressing the occurrence of a hardness difference, the upper limit of the C content may be 0.085% or 0.080% or less.

In addition, in a case where the Mn content is 1.40% or less, the C content is preferably greater than 0.075%. By strictly controlling the Mn content and the C content as described above, the diffusion of Mn in steel is promoted at a high temperature and the segregation of Mn can be reduced.

Mn: 1.00% to 2.30%

Mn is an element which increases the hardenability of steel and contributes to the improvement of a strength. In order to obtain a desired strength, the Mn content is preferably 1.00% or greater. The Mn content may be 1.05% or greater, 1.10% or greater, 1.20% or greater, 1.30% or greater, 1.40% or greater, or 1.50% or greater.

The Mn content is preferably 2.30% or less. In a case where the Mn content is 2.30% or less, it is possible to suppress the tendency for a hardness difference to occur. As a result, the occurrence of ghost lines in the outer plate component for an automobile can be further reduced. The Mn content may be 2.10% or less. Furthermore, in a case where the Mn content is 2.00% or less, it is possible to reduce the occurrence of the segregation of Mn in band shapes during solidification of the steel constituting the outer plate component for an automobile. As a result, the tendency for a hardness difference to occur in the steel constituting the outer plate component for an automobile is reduced, and thus it is possible to further reduce the ghost lines of the outer plate component for an automobile. The Mn content may be 1.95% or less, 1.90% or less, 1.85% or less, 1.80% or less, 1.75% or less, or 1.70% or less.

Si: 0.005% to 1.500%

Si is an element which forms coarse Si oxides acting as the origin of breaking. By setting the Si content to 1.500% or less, the formation of Si oxides can be reduced, and cracking hardly occurs. As a result, it is possible to further suppress the embrittlement of the steel constituting the outer plate component for an automobile. Therefore, the Si content is preferably 1.500% or less. The Si content is more preferably 1.300% or less or 1.000% or less, and even more preferably 0.800% or less, 0.600% or less, or 0.500% or less.

The lower limit of the Si content may be 0%, but in order to improve the balance between the strength and the formability, the Si content may be 0.005% or greater, 0.010% or greater, or 0.020% or greater.

Al: 0.005% to 0.700%

Al is an element functioning as a deoxidizing agent. In addition, Al is also an element which forms coarse oxides acting as the origin of breaking and embrittles the steel constituting the outer plate component for an automobile. In a case where the Al content is 0.700% or less, the formation of coarse oxides acting as the origin of breaking can be further reduced and it is possible to further suppress the tendency for a cast piece to be cracked. Therefore, the Al content is preferably 0.700% or less. The Al content is preferably 0.650% or less, 0.600% or less, 0.400% or less, 0.200% or less, or 0.100%, and more preferably 0.085% or less, 0.070% or less, 0.065% or less, or 0.060% or less.

The lower limit of the Al content may be 0%, but in order to sufficiently obtain the deoxidation effect by Al, the Al content may be 0.005% or greater. In addition, the Al content is preferably 0.010% or greater, 0.020% or greater, 0.025% or greater, 0.030% or greater, or 0.040% or greater P: 0.100% or Less P is an element which embrittles steel. In a case where the P content is 0.100% or less, it is possible to suppress the tendency for the steel sheet to embrittle and to be cracked in the process of producing the blank sheet or the outer plate component for an automobile. Therefore, the P content is preferably 0.100% or less. The P content is more preferably 0.050% or less, and even more preferably 0.030% or less or 0.020% or less from the viewpoint of productivity.

The lower limit of the P content may be 0%, but the manufacturing cost can be further reduced by setting the P content to 0.001% or greater. Therefore, the P content may be 0.001% or greater.

S: 0.0200% or Less

S is an element which forms Mn sulfides and deteriorates formability such as ductility, hole expansibility, stretch flangeability, and bendability of the steel sheet. In a case where the S content is 0.0200% or less, a significant decrease in formability of the steel sheet can be suppressed, and thus a significant decrease in formability can be suppressed. Therefore, the S content is preferably 0.0200% or less. The S content is more preferably 0.0100% or less or 0.0080% or less, and even more preferably 0.0060% or less or 0.0040% or less.

The lower limit of the S content may be 0%, but the manufacturing cost can be further reduced by setting the S content to 0.0001% or greater. Therefore, the S content may be 0.0001% or greater.

N: 0.0150% or Less

N is an element which forms nitrides and deteriorates formability such as ductility, hole expansibility, stretch flangeability, and bendability of the steel sheet. In a case where the N content is 0.0150% or less, a decrease in formability of the steel sheet can be suppressed, and thus a decrease in formability can be suppressed. Therefore, the N content is preferably 0.0150% or less. In addition, N is also an element which causes weld defects during welding and impairs productivity. Therefore, the N content is more preferably 0.0120% or less or 0.0100% or less, and even more preferably 0.0080% or less or 0.0060% or less.

The lower limit of the N content may be 0%, but the manufacturing cost can be further reduced by setting the N content to 0.0005% or greater. Therefore, the N content may be 0.0005% or greater.

O: 0.0100% or Less

O is an element which forms oxides and impairs formability such as ductility, hole expansibility, stretch flangeability, and bendability of the steel sheet. In a case where the O content is 0.0100% or less, a significant decrease in formability of the steel sheet can be suppressed, and thus a significant decrease in formability can be suppressed. Therefore, the O content is preferably 0.0100% or less. The O content is more preferably 0.0080% or less or 0.0050% or less, and even more preferably 0.0030% or less or 0.0020% or less.

The lower limit of the O content may be 0%, but the manufacturing cost can be further reduced by setting the O content to 0.0001% or greater. Therefore, the O content may be 0.0001% or greater.

The remainder of the chemical composition of the base steel sheet constituting the outer plate component for an automobile according to the present embodiment may consist of Fe and impurities. Elements which are unavoidably mixed from a steel raw material or scrap, elements which are unavoidably mixed during a steelmaking process, and elements which are allowed within a range where the characteristics of the blank sheet and press-formed article according to the present embodiment are not impaired are exemplary examples of the impurities. Examples of the impurities include H, Na, Cl, Co, Zn, Ga, Ge. As, Se, Y, Tc, Ru, Rh, Pd, Ag, Cd, In, Te, Cs, Ta, Re, Os, Ir, Pt, Au, Pb, Bi, and Po. The total amount of the impurities may be 0.100% or less.

The base steel sheet constituting the outer plate component for an automobile according to the present embodiment may contain the following elements as arbitrary elements instead of a portion of Fe. The lower limit of the amount of the following arbitrary elements is 0%.

Cr: 0% to 0.80%

Cr is an element which increases the hardenability of steel and contributes to the improvement of a strength. Cr does not need to be included. Therefore, the lower limit of the Cr content may be 0%. In order to sufficiently obtain the strength improvement effect by Cr, the Cr content is preferably 0.01% or greater or 0.20% or greater, and more preferably 0.30% or greater.

In addition, in a case where the Cr content is 0.80% or less, the formation of coarse Cr carbides which may act as the origin of breaking can be reduced. Therefore, the Cr content is preferably 0.80% or less. In order to reduce the alloying cost, the Cr content may be set to 0.60% or less, 0.40% or less, 0.20% or less, 0.10% or less, 0.06% or less, or 0.05% or less as necessary.

Mo: 0% to 0.16%

Mo is an element which suppresses phase transformation at high temperatures and contributes to the improvement of a strength. Mo does not need to be included. Therefore, the lower limit of the Mo content may be 0%. In order to sufficiently obtain the strength improvement effect by Mo, the Mo content is preferably 0.05% or greater, and more preferably 0.10% or greater.

In addition, in a case where the Mo content is 0.16% or less, it is possible to suppress a decrease in productivity due to a decrease in hot workability. Therefore, the Mo content is preferably 0.16% or less. In order to reduce the alloying cost, the Mo content may be set to 0.12% or less, 0.10% or less, 0.08% or less, 0.06% or less, 0.04% or less, or 0.02% or less as necessary.

By incorporating both Cr: 0.01% to 0.80% and Mo: 0.01% to 0.16%, the strength of the steel sheet can be more reliably improved. Therefore, both Cr: 0.01% to 0.80% and Mo: 0.01% to 0.16% are preferably contained.

Ti: 0% to 0.100%

Ti is an element having the effect of decreasing the amounts of S, N, and O which form coarse inclusions acting as the origin of breaking. In addition, Ti has the effect of refining the structure and increasing the balance between the strength and the formability of the steel sheet. Ti does not need to be included. Therefore, the lower limit of the Ti content may be 0%. In order to sufficiently obtain the above-described effect, the Ti content is preferably 0.001% or greater, and more preferably 0.010% or greater.

In addition, in a case where the Ti content is 0.100% or less, the formation of coarse Ti sulfides, Ti nitrides, and Ti oxides is reduced, and the formability of the steel sheet can be secured. As a result, the formability can be secured. Therefore, the Ti content is preferably 0.100% or less. The Ti content is preferably 0.080% or less, 0.075% or less, or 0.060% or less, and more preferably 0.040% or less or 0.020% or less. In order to reduce the alloying cost, the Ti content may be set to 0.040% or less, 0.020% or less, 0.010% or less, or 0.005% or less as necessary.

Nb: 0% to 0.060%

Nb is an element which contributes to the improvement of a strength of the steel sheet by strengthening with precipitates, grain refinement strengthening by suppressing the growth of ferrite crystal grains, and dislocation strengthening by suppressing recrystallization. Nb does not need to be included. Therefore, the lower limit of the Nb content may be 0%. In order to sufficiently obtain the above-described effect, the Nb content is preferably 0.001% or greater, more preferably 0.005% or greater, and even more preferably 0.010% or greater.

In addition, in a case where the Nb content is 0.060% or less, it is possible to suppress the remaining of unrecrystallized ferrite caused by promotion of recrystallization, and it is possible to secure the formability of the steel sheet. As a result, the formability can be secured. Therefore, the Nb content is preferably 0.060% or less. The Nb content is more preferably 0.050% or less, and even more preferably 0.040% or less. In order to reduce the alloying cost, the Nb content may be set to 0.030% or less, 0.020% or less, 0.015% or less, 0.010% or less, or 0.005% or less as necessary.

V: 0% to 0.50%

V is an element which contributes to the improvement of a strength by strengthening with precipitates, grain refinement strengthening by suppressing the growth of ferrite crystal grains, and dislocation strengthening by suppressing recrystallization. V does not need to be included. Therefore, the lower limit of the V content may be 0%. In order to sufficiently obtain the strength improvement effect by V, the V content is preferably 0.01% or greater, and more preferably 0.03% or greater.

In addition, in a case where the V content is 0.50% or less, it is possible to further suppress a decrease in formability of the steel sheet due to the precipitation of a large amount of carbonitrides. As a result, a decrease in formability is suppressed. Therefore, the V content is preferably 0.50% or less. In order to reduce the alloying cost, the V content may be set to 0.30% or less, 0.20% or less, 0.10% or less, 0.08% or less, 0.06% or less, 0.05% or less, 0.03% or less, or 0.02% or less as necessary.

Ni: 0% to 1.00%

Ni is an element which suppresses phase transformation at high temperatures and contributes to the improvement of a strength. Ni does not need to be included. Therefore, the lower limit of the Ni content may be 0%. In order to sufficiently obtain the strength improvement effect by Ni, the Ni content is preferably 0.01% or greater, more preferably 0.05% or greater, and even more preferably 0.20% or greater.

In addition, in a case where the Ni content is 1.00% or less, it is possible to suppress a decrease in weldability of the steel sheet. Therefore, the Ni content is preferably 1.00% or less. In order to reduce the alloying cost, the Ni content may be set to 0.70% or less, 0.60% or less, 0.50% or less, 0.40% or less, 0.30% or less, 0.20% or less, 0.15% or less, 0.10% or less, 0.08% or less, or 0.03% or less as necessary.

Cu: 0% to 0.00%

Cu is an element which is present in the form of fine grains in a steel and contributes to the improvement of a strength. Cu does not need to be included. Therefore, the lower limit of the Cu content may be 0%. In order to sufficiently obtain the strength improvement effect by Cu, the Cu content is preferably 0.01% or greater, more preferably 0.05% or greater, and even more preferably 0.15% or greater.

In addition, in a case where the Cu content is 1.00% or less, it is possible to further suppress a decrease in weldability of the steel sheet. Therefore, the Cu content is preferably 1.00% or less. In order to reduce the alloying cost, the Cu content may be set to 0.70% or less, 0.60% or less, 0.50% or less, 0.40% or less, 0.30% or less, 0.20% or less, 0.15% or less, 0.10% or less, 0.08% or less, or 0.03% or less as necessary.

W: 0% to 1.00%

W is an element which suppresses phase transformation at high temperatures and contributes to the improvement of a strength. W does not need to be included. Therefore, the lower limit of the W content may be 0%. In order to sufficiently obtain the strength improvement effect by W, the W content is preferably 0.01% or greater, more preferably 0.03% or greater, and even more preferably 0.10% or greater.

In addition, in a case where the W content is 1.00% or less, it is possible to suppress a decrease in productivity due to a decrease in hot workability. Therefore, the W content is preferably 1.00% or less. In order to reduce the alloying cost, the W content may be set to 0.70% or less, 0.50% or less, 0.30% or less, 0.20% or less, 0.15% or less, 0.10% or less, 0.08% or less, 0.05% or less, or 0.02% or less as necessary.

B: 0% to 0.0100%

B is an element which suppresses phase transformation at high temperatures and contributes to the improvement of a strength. B does not need to be included. Therefore, the lower limit of the B content may be 0%. In order to sufficiently obtain the strength improvement effect by B, the B content is preferably 0.0001% or greater, more preferably 0.0005% or greater, and even more preferably 0.0010% or greater.

In addition, in a case where the B content is 0.0100% or less, the generation of B precipitates is suppressed, and thus it is possible to suppress a decrease in strength. Therefore, the B content is preferably 0.0100% or less. In order to reduce the alloying cost, the B content may be set to 0.0050% or less, 0.0030% or less, 0.0020% or less, 0.0010% or less, or 0.0005% or less as necessary.

Sn: 0% to 1.00%

Sn is an element which suppresses the coarsening of crystal grains and contributes to the improvement of a strength. Sn does not need to be included. Therefore, the lower limit of the Sn content may be 0%. In order to sufficiently obtain the effect by Sn, the Sn content is preferably 0.01% or greater.

In addition, in a case where the Sn content is 1.00% or less, it is possible to suppress fracture during rolling due to embrittlement of the steel sheet. Therefore, the Sn content is preferably 1.00% or less. In order to reduce the alloying cost, the Sn content may be set to 0.50% or less, 0.20% or less, 0.10% or less, 0.05% or less, or 0.02% or less as necessary.

Sb: 0% to 0.200%

Sb is an element which suppresses the coarsening of crystal grains and contributes to the improvement of a strength. Sb does not need to be included. Therefore, the lower limit of the Sb content may be 0%. In order to sufficiently obtain the above-described effect, the Sb content is preferably 0.001% or greater, and more preferably 0.005% or greater.

In addition, in a case where the Sb content is 0.200% or less, it is possible to suppress fracture during rolling due to embrittlement of the steel sheet. Therefore, the Sb content is preferably 0.200% or less. In order to reduce the alloying cost, the Sb content may be set to 0.100% or less, 0.070% or less, 0.040% or less, 0.010% or less, or 0.005% or less as necessary.

Ca: 0% to 0.0100%
Mg: 0% to 0.0100%
Zr: 0% to 0.0100%
REM: 0% to 0.0100%

Ca, Mg, Zr, and REM are elements which contribute to the improvement of formability of the steel sheet. Ca, Mg, Zr, and REM do not need to be included. Therefore, the lower limit of the total amount of these elements includes 0%. In order to sufficiently obtain the formability improvement effect, the amount of each of these elements is preferably 0.0001% or greater, and more preferably 0.0010% or greater. All of the above elements do not need to be included in order to sufficiently obtain the above-described effect, as long as the amount of any one of them is 0.0001% or greater.

In addition, in a case where each of the Ca content, the Mg content, the Zr content, and the REM content is 0.0100% or less, it is possible to suppress a decrease in ductility of the steel sheet. Therefore, each of the Ca content, the Mg content, the Zr content, and the REM content is set to 0.0100% or less. Preferably, each of the Ca content, the Mg content, the Zr content, and the REM content is 0.0050% or less. In order to reduce the alloying cost, each of the Ca content, the Mg content, the Zr content, and the REM content may be set to 0.0030% or less, 0.0020% or less, 0.0010% or less, or 0.0003% or less as necessary. Rare earth metal (REM) refers to a total of 17 elements consisting of Sc, Y. and lanthanoids, and the REM content refers to the total amount of these elements.

The above-described chemical composition of the base steel sheet constituting the outer plate component for an automobile may be measured by a general analysis method. For example, the chemical composition may be measured using inductively coupled plasma-atomic emission spectrometry (ICP-AES). C and S may be measured using a combustion-infrared absorption method, N may be measured using an inert gas fusion-thermal conductivity method, and O may be measured using an inert gas fusion-nondispersive infrared absorption method.

In consideration of the effects of the above-described elements, in the outer plate component for an automobile according to the present embodiment, it is preferable that the base steel sheet constituting the outer plate component for an automobile contain, as a chemical composition, by mass %:

C: 0.040% to 0.105%;
Mn: 1.00% to 2.30%;
Si: 0.005% to 1.500%;
Al: 0.005% to 0.700%;
P: 0.100% or less;
S: 0.0200% or less;
N: 0.0150% or less;
O: 0.0100% or less;
Cr: 0% to 0.80%;
Mo: 0% to 0.16%;
B: 0% to 0.0100%;
Ti: 0% to 0.100%;
Nb: 0% to 0.060%;
V: 0% to 0.50%;
Ni: 0% to 1.00%;
Cu: 0% to 1.00%;
W: 0% to 1.00%;
Sn: 0% to 1.00%;
Sb: 0% to 0.200%;
Ca: 0% to 0.0100%;
Mg: 0% to 0.0100%;
Zr: 0% to 0.0100%;
REM: 0% to 0.0100%; and
a remainder consisting of Fe and impurities.

In a case where the chemical composition of the base steel sheet constituting the outer plate component for an automobile according to the present embodiment is within the above-described range, a blank sheet having a high strength with reduced segregation is obtained. As a result, in the outer plate component for an automobile obtained by pressing such a blank sheet, ghost lines are further reduced, and the appearance quality is further improved.

The outer plate component for an automobile according to the present embodiment may have a plated layer on at least one surface of the base steel sheet constituting the outer plate component for an automobile. Examples of the plated layer include a galvanized layer, a zinc alloy plated layer, and a galvannealed layer and an alloyed zinc alloy plated layer obtained by subjecting the above layers to an alloying treatment.

The galvanized layer and the zinc alloy plated layer may contain one or two or more of Al, Ag, B, Be, Bi, Ca, Cd, Co, Cr, Cs, Cu, Ge, Hf, Zr, I, K, La, Li, Mg, Mn, Mo, Na, Nb, Ni, Pb, Rb, Sb, Si, Sn, Sr, Ta, Ti, V, W. Zr, and REM within a range where the corrosion resistance and formability of the outer plate component for an automobile are not impaired. In particular, Ni, Al, and Mg are effective for improving the corrosion resistance.

In a case where the Al content of the galvanized layer is 0.5 mass % or less, the adhesion between the steel sheet surface and the galvanized layer can be sufficiently secured. Therefore, the Al content of the galvanized layer is preferably 0.5 mass % or less.

The galvanized layer and the zinc alloy plated layer are formed using a hot-dip plating method, an electroplating method, or a deposition plating method.

In a case where the galvanized layer is a hot-dip galvanized layer formed by a hot-dip plating method, the Fe content of the hot-dip galvanized layer is preferably 3.0 mass % or less in order to increase the adhesion between the steel sheet surface and the hot-dip galvanized layer.

In a case where the galvanized layer is an electrogalvanized layer formed by an electroplating method, the Fe content of the electrogalvanized layer is preferably 0.5 mass % or less from the viewpoint of improving the corrosion resistance.

In a case where the plated layer is a galvannealed layer or alloyed zinc alloy plated layer obtained by subjecting a hot-dip galvanized layer or hot-dip zinc alloy plated layer to an alloying treatment, the Fe content of the galvannealed layer or alloyed zinc alloy plated layer is preferably 7.0 to 13.0 mass % from the viewpoint of improving the adhesion between the steel sheet surface and the galvannealed layer or alloyed zinc alloy plated layer. By performing an alloying treatment on the steel sheet having hot-dip galvanized layer or the hot-dip zinc alloy plated layer, Fe is incorporated into the plated layer and the Fe content increases. As a result, the Fe content can be adjusted to 7.0 mass % or greater. That is, the galvanized layer having a Fe content of 7.0 mass % or greater is a galvannealed layer or alloyed zinc alloy plated layer.

The Al content and the Fe content in the plated layer can be obtained by the following method. Only the plated layer is removed by dissolving with a 5 vol % HCl aqueous solution to which an inhibitor is added. By measuring the Fe content in the obtained solution using ICP-AES, the Fe content (mass %) in the plated layer is obtained.

In a case where the outer plate component for an automobile has a plated layer, the chemical composition of the base steel sheet may be analyzed after removing the plated layer from the surface by mechanical grinding.

The thickness of the base steel sheet constituting the outer plate component for an automobile is preferably 0.2 nm to 5.0 mm in consideration of versatility and manufacturability. In a case where the base steel sheet constituting the outer plate component for an automobile includes a plated layer, the above thickness includes the thickness of the plated layer. The thickness of the base steel sheet constituting the outer plate component for an automobile depends on the sheet thickness of the steel sheet to be blanked. A steel sheet having a sheet thickness of 0.2 mm or greater easily maintains its flat shape, and thus it is possible to improve the dimensional accuracy and shape accuracy during blanking. Accordingly, a base steel sheet constituting an outer plate component for an automobile having a thickness of 0.2 mm or greater has high dimensional accuracy and shape accuracy. Therefore, the thickness of the base steel sheet constituting the outer plate component for an automobile is preferably 0.2 mm or greater. The thickness of the base steel sheet constituting the outer plate component for an automobile is more preferably 0.4 mm or greater.

Meanwhile, in a case where the sheet thickness of the steel sheet to be blanked is 5.0 mm or less, appropriate strain application and temperature control can be easily performed in the manufacturing process, and a homogeneous structure can be obtained. Accordingly, a base steel sheet constituting an outer plate component for an automobile having a thickness of 5.0 mm or less has a more homogeneous structure. Therefore, the thickness of the base steel sheet constituting the outer plate component for an automobile is preferably 5.0 mm or less. The thickness of the base steel sheet constituting the outer plate component for an automobile is more preferably 4.5 mm or less. From the viewpoint of reducing the weight of the automobile, the thickness of the base steel sheet constituting the outer plate component for an automobile is even more preferably 0.7 mm or less, and furthermore preferably 0.6 mm or less, or may be 0.5 mm or less.

Hitherto, the outer plate component for an automobile according to the present embodiment has been described.

The blank sheet acting as a material for the outer plate component for an automobile according to the present embodiment is not particularly limited, but preferably a blank sheet to be described later. Hereinafter, an example of the blank sheet acting as a material for the outer plate component for an automobile according to the present embodiment will be described.

The blank sheet according to the present embodiment is a material for the outer plate component for an automobile manufactured by press forming, and includes a steel sheet. The rolling direction of the steel sheet extends along the longitudinal direction of the blank sheet, and the thickness of the blank sheet is 0.6 mm or less. The blank sheet according to the present embodiment can be used for the above-described outer plate component for an automobile.

The blank sheet according to the present embodiment preferably has the same chemical composition as the steel sheet constituting the above-described outer plate component for an automobile, and may include the above-described plated layer on at least one surface thereof.

[Arithmetic Average Waviness Wa: 0.10 to 0.30 μm]

In general, the smaller the arithmetic average waviness Wa of the blank sheet, the more preferable it is from the viewpoint of appearance quality. This is because, the appearance quality deteriorates in a case where the surface roughness is excessively large. However, the present inventors have found that in order to reduce the occurrence of ghost lines in the outer plate component for an automobile, the surface of the blank sheet is properly roughened to the extent that the appearance quality does not deteriorate, and thus the occurrence of ghost lines can be further reduced. Therefore, the arithmetic average waviness Wa of the blank sheet according to the present embodiment is preferably 0.10 μm or greater. The arithmetic average waviness Wa of the blank sheet according to the present embodiment is more preferably 0.13 μm or greater.

In addition, in a case where the arithmetic average waviness Wa is 0.30 μm or less, more excellent appearance quality can be obtained for the appearance of the outer plate component for an automobile and the blank sheet. Therefore, the arithmetic average waviness Wa is preferably 0.30 μm or less. The arithmetic average waviness Wa of the blank sheet according to the present embodiment is more preferably 0.25 μm or less.

In a case where the blank sheet has no plated layer, the arithmetic average waviness Wa is the arithmetic average waviness of the steel sheet, and in a case where the blank sheet has a plated layer on the surface thereof, the arithmetic average waviness Wa is the arithmetic average waviness of the plated layer.

In the present embodiment, the arithmetic average waviness Wa is obtained by the following method.

A test piece of 50 mm×50 mm is cut out from a position 10 mm or greater away from an end surface of the blank sheet. Next, three lines of profile are measured along the direction perpendicular to the rolling direction using a laser displacement measurement device (Keyence VK-X1000). From the obtained results, a waviness curve is obtained by sequentially applying contour curve filters with cut-off values $\lambda c$ and $\lambda f$ to a cross-sectional curve in accordance with JIS B 0601: 2013. Specifically, a waviness curve is obtained by removing a component with a wavelength $\lambda c$ of 0.8 mm or shorter and a component with a wavelength $\lambda f$ of 2.5 mm or longer from the obtained measurement results. Based on the obtained waviness curve, arithmetic average waviness is calculated in accordance with JIS B 0601: 2013, and the average values of a total of the three lines are calculated. The arithmetic average of the calculated average values of the three lines is defined as the arithmetic average waviness Wa of the steel sheet.

In a case where the blank sheet has a plated layer on the surface thereof, the above-described line analysis may be performed on the surface of the plated layer.

In consideration of the effects of the above-described elements and the effects of the arithmetic average waviness Wa, it is preferable that the base steel sheet constituting the blank sheet according to the present embodiment contain, as a chemical composition, by mass %:
C: greater than 0.075% and 0.100% or less;
Mn: 1.00% to 1.40%;
Si: 0.005% to 1.500%;
P: 0.100% or less;
S: 0.0200% or less;
Al: 0.005% to 0.700%;
N: 0.0150% or less;
O: 0.0100% or less;
Cr: 0% to 0.80%;
Mo: 0% to 0.16%;
B: 0% to 0.0100%;
Ti: 0% to 0.100%;
Nb: 0% to 0.060%;
V: 0% to 0.50%;
Ni: 0% to 1.00%;
Cu: 0% to 1.00%;
W: 0% to 1.00%;
Sn: 0% to 1.00%;
Sb: 0% to 0.200%;
Ca: 0% to 0.0100%;
Mg: 0% to 0.0100%;
Zr: 0% to 0.0100%;
REM: 0% to 0.0100%; and
a remainder: Fe and impurities, and
that the arithmetic average waviness Wa be 0.10 to 0.30 μm.

In a case where the chemical composition of the base steel sheet constituting the blank sheet is within the above range, the segregation of Mn in band shapes is reduced. As a result, the generation of martensite due to annealing is suppressed, and an increase in hardness difference is suppressed. In the blank sheet in which the hardness difference is suppressed, the occurrence of ghost lines in the press forming is further reduced. Furthermore, in a case where the arithmetic average waviness Wa is 0.10 to 0.30 μm, more excellent appearance quality can be obtained.

In addition, similarly, in consideration of the effects of the above-described elements and the effects of the arithmetic average waviness Wa, it is preferable that the base steel sheet constituting the blank sheet according to the present embodiment contain, as a chemical composition, by mass %:

C: 0.040% to 0.075%;
Mn: 1.00% to 2.00%;
Si: 0.005% to 1.500%;
P: 0.100% or less;
S: 0.0200% or less;
Al: 0.005% to 0.700%;
N: 0.0150% or less;
O: 0.0100% or less;
Cr: 0% to 0.80%;
Mo: 0% to 0.16%;
B: 0% to 0.0100%;
Ti: 0% to 0.100%;
Nb: 0% to 0.060%;
V: 0% to 0.50%;
Ni: 0% to 1.00%;
Cu: 0% to 1.00%;
W: 0% to 1.00%;
Sn: 0% to 1.00%;
Sb: 0% to 0.200%;
Ca: 0% to 0.0100%;
Mg: 0% to 0.0100%;
Zr: 0% to 0.0100%;
REM: 0% to 0.0100%; and
a remainder: Fe and impurities, and
that the arithmetic average waviness Wa be 0.10 to 0.30 μm.

Also, in a case where the chemical composition of the base steel sheet constituting the blank sheet is within the above range, the segregation of Mn in band shapes is reduced and an increase in hardness difference is suppressed. In the blank sheet in which the hardness difference is suppressed, the occurrence of ghost lines in the press forming is reduced. Furthermore, in a case where the arithmetic average waviness Wa is 0.10 to 0.30 Wm, more excellent appearance quality can be obtained.

[ΔC Calculated from $C_{20}$ that is C Content at Depth Position of 20 μm from Surface, $C_{60}$ that is C Content at Depth Position of 60 μm from Surface, and Expression (1): 0.20 to 0.90 Mass %/Mm $$\Delta C = (C_{60} - C_{20})/(0.04)]\quad(1)$$

ΔC represents the C concentration gradient in a region from a depth position of 20 μm from the surface to a depth position of 60 μm from the surface. By setting ΔC to 0.20 to 0.90 mass %/mm, it is possible to suppress a rapid increase in C concentration gradient in the decarburized layer. As a result, it is possible to suppress the occurrence of ghost lines after press forming.

In the base steel sheet having the chemical composition according to the present embodiment, ΔC of less than 0.20 mass %/mm means that the decarburization has not sufficiently occurred or excessively proceeded up to a very deep position from the steel sheet surface. In a case where the decarburization does not sufficiently occur, a variation in hardness of the base steel sheet has a significant influence, and it may be difficult to suppress the occurrence of ghost lines. On the other hand, in a case where the decarburization excessively occurs, softening may proceed and a desired steel sheet strength may not be obtained in some cases. Therefore. ΔC is preferably 0.20 mass %/mm or greater. In addition, in a case where ΔC is greater than 0.90 mass %/mm, the hardness difference may be noticeably exhibited in the decarburized layer and it may be difficult to suppress the occurrence of ghost lines in some cases. ΔC is more preferably set to 0.30 mass %/mm or greater, 0.35 mass %/mm or greater, 0.40 mass %/mm or greater, or 0.45 mass %/mm or greater. In addition, ΔC is preferably set to 0.80 mass %/mm or less or 0.75 mass %/mm or less.

In a case where the base steel sheet has a plated layer on the surface thereof, the term "surface" in the phrase "depth position of 20 μm from the surface" and the phrase "depth position of 60 μm from the surface" refer to the interface between the plated layer and the base metal. In the measurement of a Fe content from the surface by GDS analysis performed by a method to be described later, the depth position where the Fe content becomes 95 mass % or greater is regarded as the interface between the plated layer and the base metal.

In addition, the reason why ΔC is specified at a depth position of 20 μm or greater from the surface is that a C concentration at a depth of less than 20 μm from the surface does not affect the ghost lines.

ΔC is obtained by the following method.

At any three positions on the steel sheet, the C content (mass %) is measured up to 100 μm in the depth direction (the sheet thickness direction) from the steel sheet surface by glow discharge optical emission spectrometry (GDS analysis). ΔC (mass %/mm) is calculated from the C content ($C_{20}$) at a depth position of 20 μm from the surface, the C content (Cu)) at a depth position of 60 μm from the surface, and Expression (1). ΔC is obtained by calculating the average value of ΔC at the three positions.

For the measurement, a Marcus type glow discharge optical emission spectrometer (GD-Profiler) manufactured by Horiba Ltd. is used.

In consideration of the effects of the above-described elements and the effects of the C concentration gradient, it is preferable that the base steel sheet constituting the blank sheet according to the present embodiment contain, as a chemical composition, by mass %:

C: 0.040% to 0.105%;
Mn: 1.00% to 2.30%;
Si: 0.005% to 1.500%;
Al: 0.005% to 0.700%;
P: 0.100% or less;
S: 0.0200% or less;
N: 0.0150% or less;
O: 0.0100% or less;
Cr: 0% to 0.80%;
Mo: 0% to 0.16%;
Ti: 0% to 0.100%;
B: 0% to 0.0100%;
Nb: 0% to 0.060%;
V: 0% to 0.50%;
Ni: 0% to 1.00%;

Cu: 0% to 1.00%;
W: 0% to 1.00%;
Sn: 0% to 1.00%;
Sb: 0% to 0.200%;
Ca: 0% to 0.0100%;
Mg: 0% to 0.0100%;
Zr: 0% to 0.0100%;
REM: 0% to 0.0100%; and
a remainder: Fe and impurities, and
ΔC calculated from $C_{20}$ that is the C content at a depth position of 20 μm from the surface, $C_{60}$ that is the C content at a depth position of 60 μm from the surface, and Expression (1) be 0.20 to 0.90 mass %/mm.

In a case where the chemical composition of the base steel sheet constituting the blank sheet according to the present embodiment is within the above-described range and ΔC is 0.20 to 0.90 mass %/mm, the hardness difference in the decarburized layer can be reduced. As a result, in the outer plate component for an automobile obtained by pressing such a blank sheet, ghost lines are further reduced, and the appearance quality is further improved.

In the blank sheet according to the present embodiment, the arithmetic average waviness Wa may be 0.10 to 0.30 μm and ΔC may be 0.20 to 0.90 mass %/mm from the viewpoint of appearance quality.

The yield stress of the blank sheet may change in the automobile manufacturing process such as a vehicle assembly step or a coating baking step. In a case where the yield stress of the blank sheet is 240 MPa or greater, the final yield stress is about 400 MPa or greater. Accordingly, the yield stress of the blank sheet is preferably 240 MPa or greater. The yield stress of the blank sheet is more preferably 300 MPa or greater. The upper limit of the yield stress of the blank sheet is not particularly limited, and may be, for example, 350 MPa or 450 MPa.

The larger the tensile strength of the steel sheet, the more likely the ghost lines are to occur. Accordingly, the tensile strength of the blank sheet is preferably 440 MPa or greater. The tensile strength of the blank sheet is more preferably 500 MPa or greater, and even more preferably 550 MPa or greater or 600 MPa or greater.

In addition, by setting the tensile strength to 750 MPa or less, it is possible to suppress a deterioration in external appearance after press forming. Therefore, the tensile strength of the blank sheet is preferably 750 MPa or less. The tensile strength of the blank sheet is more preferably 700 MPa or less.

The tensile strength of the blank sheet is evaluated in accordance with JIS Z 2241: 2011. As a test piece, a No. 5 test piece of JIS Z 2241: 2011 is used. As a position where a tensile test piece is collected, a ¼ portion extending from the end portion in the sheet width direction (the direction perpendicular to the rolling direction on the surface of the blank sheet) is set, and a direction perpendicular to the rolling direction is set as a longitudinal direction.

The tensile strength is evaluated in accordance with JIS Z 2241: 2011. As a test piece, a No. 5 test piece of JIS Z 2241: 2011 is used. As a position where a tensile test piece is collected, a ¼ portion extending from the end portion in the sheet width direction is set, and a direction perpendicular to the rolling direction is set as a longitudinal direction.

The thickness of the blank sheet according to the present embodiment is 0.6 mm or less. The thickness of the blank sheet is more preferably 0.5 mm or less from the viewpoint of reducing the weight of the automobile. The lower limit of the thickness of the blank sheet is not particularly limited, and the thickness of the blank sheet may be, for example, 0.2 mm or greater. The thickness of the blank sheet is preferably 0.4 mm or greater from the viewpoint of securing the strength.

In general, the sheet thickness of a steel sheet used for an automobile frame member such as a cross member is 1.0 mm or greater from the viewpoint of securing the strength. The blank sheet according to the present embodiment is used for an outer plate component for an automobile, and has a different sheet thickness from a steel sheet used for an automobile frame member.

The blank sheet according to the present embodiment has a substantially line-symmetric shape, and is, for example, polygonal, such as trapezoidal, rectangular, or hexagonal. In the blank sheet according to the present embodiment, a direction perpendicular to the axis of symmetry is along the rolling direction. The direction perpendicular to the axis of symmetry corresponds to the longitudinal direction of the blank sheet. The direction perpendicular to the axis of symmetry is preferably coincident with the rolling direction, but may not be necessarily coincident therewith. The direction perpendicular to the axis of symmetry may form an angle with the rolling direction within a range where ghost lines can be reduced during press forming. For example, the angle formed by the direction perpendicular to the axis of symmetry and the rolling direction is 15° or less.

Figure 4:
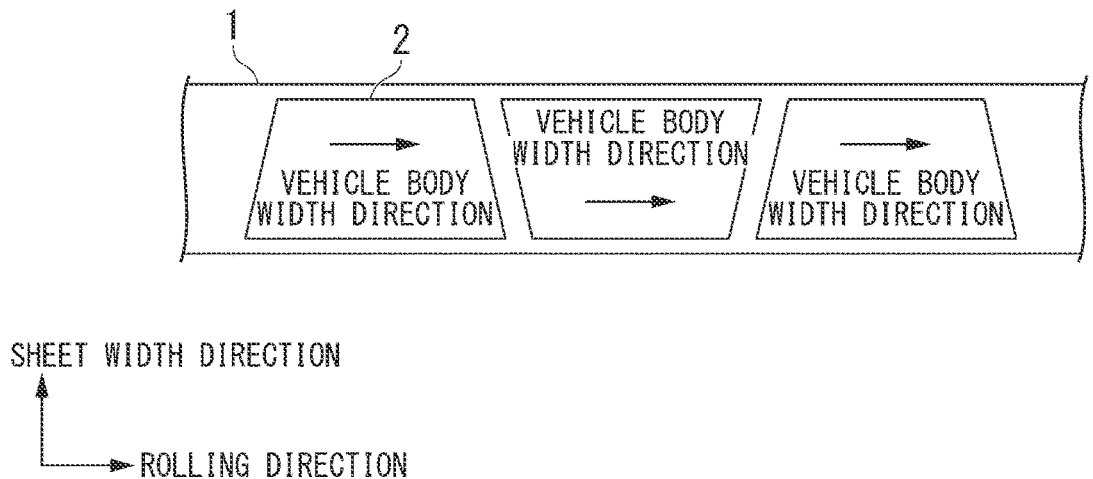
FIG. 4 is a diagram showing an example of the directions of blanking by a manufacturing method for a blank sheet according to an embodiment of the present invention.

Next, a manufacturing method for the blank sheet according to the present embodiment will be described with reference to FIG. 4. FIG. 4 is a diagram showing an example of the directions of blanking by the manufacturing method for the blank sheet according to the present embodiment.

The manufacturing method for the blank sheet according to the present embodiment is a manufacturing method for a blank sheet including a steel sheet, and has a blanking step of blanking the steel sheet so that a rolling direction of the steel sheet extends along the longitudinal direction of the blank sheet. The blanking mentioned herein refers to punching using a die and punch or the like and cutting out using a shear from the blank sheet which is a material.

First, examples of a manufacturing method for a rolled steel sheet which is a material for the blank sheet will be described. The manufacturing methods for a rolled steel sheet which is a material for the blank sheet which will be described below are merely examples, and are not limited to the manufacturing methods which will be described below.

[First Manufacturing Method]

Using a steel having the above-described chemical composition, a steel sheet in which arithmetic average waviness Wa is preferably controlled can be stably manufactured by, for example, collectively and inseparably controlling the following conditions (I) to (IV). Hereinafter, the conditions will be described.

(I) The coiling temperature is set to 550° C. or higher.
(II) The pickling time is set to 50 seconds or longer.
(II) Surface roughness Ra of the surface of a rolling roll in the final pass of cold rolling is set to 0.2 to 0.7 μm.
(IV) The rolling reduction in temper rolling is set to 0.3% to 0.7%, and the surface roughness Ra of the rolling roll is set to 1.5 to 3.5 μm.

(I) Coiling Temperature: 550° C. or Higher

By setting the coiling temperature after hot rolling in a high temperature range of 550° C. or higher, scale is likely to occur on the surface of the steel sheet. As a result, protrusions and recesses are likely to be generated on the surface of the steel sheet after pickling. The coiling temperature is more preferably 600° C. or higher, and even more preferably 650° C. or higher.

(II) Pickling Time: 50 Seconds or Longer

By setting the pickling time to 50 seconds or longer in the pickling after coiling and before cold rolling, protrusions and recesses are likely to be generated on the surface of the steel sheet. The pickling time is more preferably set to 70 seconds or longer.

(III) Arithmetic Average Roughness Ra of Rolling Roll in Final Pass of Cold Rolling: 0.2 to 0.7 μm After pickling, by setting surface roughness Ra of the surface of a rolling roll in the final pass of cold rolling to 0.2 to 0.7 μm, appropriate protrusions and recesses can be formed on the surface of the steel sheet during cold rolling. The arithmetic average roughness Ra of the rolling roll is more preferably set to 0.3 μm or greater. The arithmetic average roughness Ra is arithmetic average roughness.

Since a normal rolling roll does not have the above-described arithmetic average roughness Ra, the steel sheet according to the present embodiment cannot be manufactured. In order to manufacture the steel sheet according to the present embodiment, it is desirable to use a special rolling roll in the final pass of cold rolling.

(IV) Rolling Reduction in Temper Rolling: 0.3% to 0.7%, Arithmetic Average Roughness Ra of Rolling Roll: 1.5 to 3.5 μm.

In the temper rolling after annealing (after plating in case of a plating material), by setting the rolling reduction to 0.3% to 0.7% and setting the arithmetic average roughness Ra of the surface of the rolling roll to 1.5 to 3.5 pin, protrusions and recesses can be formed on the surface of the steel sheet. The rolling reduction during temper rolling is more preferably set to 0.5% or greater, and the surface roughness Ra of the surface of the rolling roll is more preferably set to 2.3 μm or greater.

Conditions other than the above-described conditions are not particularly limited. For example, a slab which is a material for the steel sheet may be heated in a temperature range of 1,100° C. or higher and lower than 1,200° C. for 30 minutes. After the slab is heated, hot rolling is performed. After hot rolling, coiling is performed, and then pickling is performed. After pickling, cold rolling is performed. In the cold rolling, the cumulative rolling reduction is preferably set to 30% to 90%. After cold rolling, annealing is performed. Then, the above-described plated layer is formed as necessary. After that, temper rolling is preferably performed.

In addition, in the manufacturing of the rolled steel sheet which is a material for the blank sheet, decarburization annealing may be performed on the steel sheet after cold rolling, obtained by the above-described method. In that case, for example, the dew point during decarburization annealing (the average dew point in an annealing furnace) is set to −20° C. or higher, and the staying time of the steel sheet in a temperature range of 700° C. or higher is set to 50 to 400 seconds to stably subject the steel sheet surface to decarburization. The upper limit of the dew point is not particularly determined, but is generally about 10° C. In a case where the dew point is too low or the staying time is too short, decarburization does not proceed sufficiently. In addition, in a case where the staying time is too long, a sufficient tensile strength may not be obtained. The temperature during annealing is, for example, about 750° C. to 850° C.

According to the above-described first manufacturing method, a steel sheet having arithmetic average waviness Wa of 0.10 to 0.30 μm can be manufactured.

[Second Manufacturing Method]

By performing annealing under the following conditions after hot rolling and after cold rolling with the use of a steel having the above-described chemical composition, a steel sheet in which ΔC (C concentration gradient) is preferably controlled can be stably manufactured.

(Annealing after Hot Rolling)

First, a slab having the above-described chemical composition is hot-rolled under general conditions to obtain a hot-rolled steel sheet. The obtained hot-rolled steel sheet is subjected to primary annealing in a high temperature range under air atmosphere. The primary annealing is performed under conditions of an annealing temperature of 550° C. to 700° C. and an annealing time of 2 hours or longer. By performing the annealing in a high temperature range after hot rolling, internal oxides of Si and Mn are formed in the surface layer of the steel sheet. As a result, the concentration of Si and Mn in the surface is suppressed in the annealing after cold rolling, and decarburization is promoted. Therefore, ΔC can be preferably controlled.

In a case where the annealing temperature is lower than 550° C. or the annealing time is shorter than 2 hours, it may not be possible to preferably control ΔC of the steel sheet.

After the annealing is performed, a pickling treatment is performed and cold rolling in which the cumulative rolling reduction is 70% or greater is performed to manufacture a steel sheet or a steel strip having a desired thickness. In a case where the cumulative rolling reduction is set to 70% or greater in the cold rolling, austenite recrystallization is promoted during annealing after cold rolling, and an increase in fraction of austenite can be suppressed. As a result, the fraction of ferrite with a high diffusion coefficient of C increases during annealing after cold rolling, and decarburization is promoted.

The cumulative rolling reduction mentioned herein is represented by $\{1-(\text{sheet thickness after cold rolling}/\text{sheet thickness before cold rolling})\} \times 100(\%)$.

After cold rolling, secondary annealing is further performed to obtain a steel sheet having desired mechanical properties. In that case, for example, the dew point during secondary annealing (the average dew point in an annealing furnace) is set to −10° C. or higher, and the staying time of the steel sheet in a temperature range of 700° C. or higher is set to 50 to 400 seconds to stably subject the steel sheet surface to decarburization. The upper limit of the dew point is not particularly determined, but is generally about 10° C. In a case where the dew point is too low or the staying time is too short, decarburization does not proceed sufficiently and it is not possible to preferably control ΔC. In addition, in a case where the staying time is too long, a sufficient tensile strength may not be obtained. The temperature during annealing is, for example, about 750° C. to 850° C.

Conditions other than the above-described conditions are not particularly limited. For example, a slab which is a material for the steel sheet may be heated in a temperature range of 1,100° C. or higher and hot-rolled. The above-described plated layer may be formed as necessary.

According to the above-described second manufacturing method, a steel sheet in which ΔC is 0.20 to 0.90 mass %/mm can be manufactured.

For example, a rolled steel sheet manufactured by the above-described method, which is a material for the blank sheet, is blanked so that the rolling direction of the steel sheet extends along the direction that becomes the vehicle body left-right direction of the outer plate component for an automobile. The example shown in FIG. 4 is an example in which using, for example, a blanking press device, blank sheets 2 are punched from a rolled steel sheet 1 which is a material for the blank sheet. In FIG. 4, the blank sheet 2 has a substantially trapezoidal shape and is punched so that two substantially parallel sides of the substantially trapezoidal shape extend in the rolling direction of the rolled steel sheet 1 which is a material for the blank sheet. In this case, the direction in which the two substantially parallel sides extend is the vehicle body left-right direction. In a case where a blanking press device is used, the blank sheets 2 are punched at arbitrary intervals as shown in FIG. 4.

Further, in a case where the blanking is performed by a shear (so-called turn shear) having a mechanism for cutting at an arbitrary angle, the blank sheets 2 are cut out without intervals from the rolled steel sheet 1 which is a material for the blank sheet so that the amount of end materials is reduced.

For example, the technique described in Patent Document 2 is a technique for improving a yield in the manufacturing of a cylindrical container using a long metal sheet as a material, and cannot be applied to the manufacturing of an outer plate component for an automobile. In a general technique for manufacturing an outer plate component for an automobile, in consideration of the yield, blanking is performed so that the rolling direction of the steel sheet and the direction that becomes the vehicle body front-back direction when press forming is performed are aligned. However, in the manufacturing method for the blank sheet according to the present embodiment, unlike the above, a rolled steel sheet which is a material for the blank sheet is blanked so that the rolling direction of the steel sheet extends along the direction which becomes the vehicle body left-right direction of the outer plate component for an automobile. Therefore, in the manufacturing method for the blank sheet according to the present embodiment, the yield may be reduced. However, the reduction in yield can be suppressed by alternating the directions of blanking. Therefore, in the manufacturing method for the blank sheet according to the present embodiment, the directions of blanking of the blank sheets 2 are preferably alternated as shown in FIG. 4.

As described above, the directions of blanking of the blank sheets 2 are preferably alternated, but the directions of blanking may be the direction in which the blank sheets 2 are in the same posture. For example, in a case where the blank sheet 2 has a substantially trapezoidal shape, blanking may be performed so that the short side of two substantially parallel sides is disposed on one end side of the rolled steel sheet which is a material for the blank sheet.

In addition, the blanking may be performed so that the blank sheet 2 has a substantially line-symmetric shape such as a rectangular shape.

Figure 5:
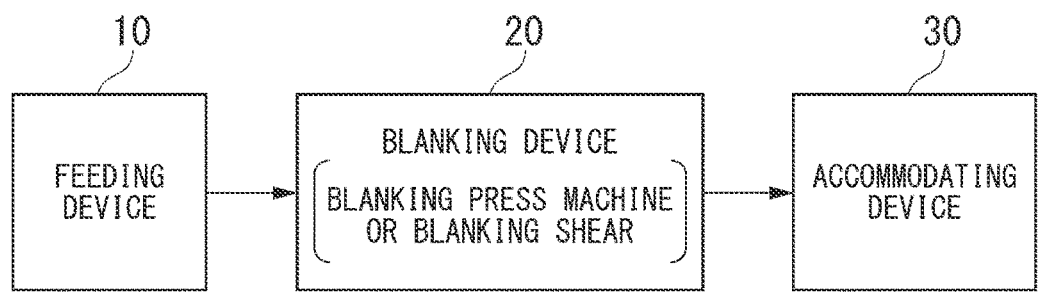
FIG. 5 is a block diagram showing an example of a manufacturing facility for the blank sheet according to the same embodiment.

Next, a manufacturing facility for the blank sheet according to the present embodiment will be described with reference to FIG. 5. FIG. 5 is a block diagram showing an example of the manufacturing facility for the blank sheet according to an embodiment of the present invention.

The manufacturing facility for the blank sheet according to the present embodiment includes a feeding device 10, a blanking device 20, and an accommodating device 30.

The feeding device 10 feeds, to the blanking device 20, a rolled steel sheet which is a material for the blank sheet. The feeding device 10 is not particularly limited, and may be a feeding device provided in a known blanking facility. The feeding device 10 may include at least any one of a rewinding device for rewinding a coil, a leveling device for making the rewound coil flat, and a cutting device for cutting a steel strip made flat to a predetermined dimension. The rolled steel sheet inserted by the feeding device 10, which is a material for the blank sheet, may be a leveled steel strip, or a long steel sheet (strip) prepared by cutting a steel strip to a predetermined length. The rolled steel sheet which is a material for the blank sheet is processed by the blanking device 20.

The blanking device 20 blanks the steel sheet so that the rolling direction of the steel sheet extends along the longitudinal direction of the blank sheet. The blanking device 20 is, for example, a blanking shear having a shear for cutting out the blank sheet from the steel sheet which is a material for the blank sheet, or a blanking press machine having a die and punch for punching the blank sheet from the steel sheet. The blanking device 20 blanks the steel sheet so that the rolling direction of the steel sheet extends along the direction which becomes the vehicle body left-right direction of the outer plate component for an automobile. In a case where the blanking device 20 is a blanking shear, the shear is preferably a turn shear in order to cut out the blank sheet in an alternating manner from the rolled steel sheet. In addition, in a case where the blanking device 20 is a blanking press machine, it is preferable that two dies and punches be alternately arranged in order to punch the blank sheet in an alternating manner from the rolled steel sheet.

The accommodating device 30 is a device for loading the blank sheet. The accommodating device 30 is not particularly limited, and may be an accommodating device provided in a known blanking facility. The accommodating device 30 may have, for example, a transport unit for transporting the blank sheet obtained by the blanking device 20 and an accommodating portion for loading and accommodating the blank sheet.

The manufacturing facility for the blank sheet according to the present embodiment has been described. However, the configuration of the manufacturing facility for the blank sheet according to the present embodiment is not limited to the above-described configuration, and may further include a known configuration as necessary.

Next, a manufacturing method for the outer plate component for an automobile according to the present embodiment will be described. In the manufacturing method for the outer plate component for an automobile according to the present embodiment, the press forming may be performed so that the rolling direction of the steel sheet of the blank sheet is along the vehicle body left-right direction. As a press forming method, for example, after the blank sheet is pressed by a blank holder and a die, a punch is pressed against it to apply strain to the steel sheet and the blank sheet is stretched. In this way, the outer plate component for an automobile can be formed. Such forming is called drawing or stretch-expand forming.

EXAMPLES

The present inventors verified the ghost line reduction effect by the chemical composition, arithmetic average waviness Wa, and ΔC described above in the blank sheet. Conditions in the examples are merely examples of conditions adopted to confirm the feasibility and effect of the present invention. The present invention is not limited to the examples of conditions. The present invention can adopt various conditions as long as the object of the present invention is achieved without departing from the gist of the present invention.

Example 1

Steels having a chemical composition shown in Table 1 were melted and continuously cast to manufacture slabs having a thickness of 240 to 300 mm. Using the obtained slabs, cold-rolled steel sheets and plated steel sheets were manufactured under conditions (I) to (VI) to be described later. In Table 2, in a case where the condition was satisfied, "OK" was entered into the column corresponding to the condition, and in a case where the condition was not satisfied, "NG" was entered into the column corresponding to the condition. In addition, the obtained steel sheets and plated steel sheets had a sheet thickness of 0.2 to 2.0 mm.

In addition, annealing was performed after cold rolling.

Manufacturing conditions other than the conditions (I) to (VI) were as described below. The slabs were heated in a temperature range of 1,100° C. or higher, and then hot-rolled. After hot rolling, the slabs were wound, and then pickled. After pickling, cold rolling was performed thereon with a cumulative rolling reduction of 30% to 90%. Annealing was performed after cold rolling, and a hot-dip galvannealed layer (GA), a hot-dip galvanized layer (GI), and an electroplated layer (EG) were formed as necessary. After that, temper rolling was performed.

The conditions (I) to (VI) in the table are as follows.

(I) The coiling temperature is set to 550° C. or higher.
(II) The pickling time is set to 50 seconds or longer.
(III) Arithmetic average roughness Ra of the surface of a rolling roll in the final pass of cold rolling is set to 0.2 to 0.7 μm.
(IV) The rolling reduction in temper rolling is set to 0.3% to 0.7%, and the arithmetic average roughness Ra of the rolling roll is set to 1.5 to 3.5 μm.
(V) The slab is heated in a temperature range of 1,200° C. or higher and held in the temperature range for 5 hours or longer.
(VI) Annealing is performed with a dew point (the average dew point in an annealing furnace) set to −20° C. or higher and a staying time of the steel sheet set to 50 to 400 seconds in a temperature range of 700° C. or higher.

Next, using the manufactured steel sheets and plated steel sheets (blank sheets), substantially semi-cylindrical simulated components (press-formed articles) simulating a door outer were manufactured by press forming. In the press forming of the simulated components, the material (the steel sheet or plated steel sheet) was actively allowed to flow into a die and punch, so that at any position on the surface of the simulated component, a ratio of, to strain in an arbitrary direction along the surface of the simulated component, strain in a direction perpendicular to the direction (the arbitrary direction) was about 1. That is, the press forming was performed so that the anisotropy of strain did not occur at any position on the surface of the simulated component. Therefore, in the present example, the way ghost lines occur in the simulated components does not depend on the direction of the blank sheet.

With respect to the obtained steel sheets and plated steel sheets, the arithmetic average waviness Wa and the tensile strength were obtained by the above-described method.

In a case where the obtained tensile strength was 500 MPa or greater, the steel sheet was determined to have a high strength and be acceptable. Meanwhile, in a case where the tensile strength was less than 500 MPa, the steel sheet was determined to be inferior in strength and be unacceptable.

In addition, an average value μ of the Mn concentrations and a standard deviation σ of the Mn concentrations were obtained by the following methods.

A cross section of a base steel sheet in the sheet thickness direction was mirror-polished, and at a predetermined depth position, the Mn concentration was measured at 600 points at measurement intervals of 1 μm in the rolling direction of the base steel sheet. By calculating the average value of the obtained Mn concentrations, the Mn concentration (mass %) at the predetermined depth position was obtained. This operation was performed every 1 μm in the sheet thickness direction from a position ⅛ of the sheet thickness away from the surface of the base steel sheet in the sheet thickness direction to a position ⅜ of the sheet thickness away from the surface in the sheet thickness direction. By calculating the average value (arithmetic average) of all the obtained Mn concentrations, the average value μ of the Mn concentrations was obtained. In addition, by calculating a standard deviation from all the obtained Mn concentrations, the standard deviation σ of the Mn concentrations was obtained.

The device used was an electron probe microanalyzer (EPMA), and an acceleration voltage of 15 kV was set as a measurement condition.

In a case where $(3\sigma/\mu) \times 100$ is 7.0 or less, the segregation of Mn in the base steel sheet is significantly reduced.

In addition, the thickness of a decarburized layer was obtained by the following method.

At any three positions on the base steel sheet, the C concentration was measured at every 1 μm depth in a region from the surface of the base steel sheet to a position ½ of the sheet thickness away therefrom in the depth direction (the sheet thickness direction). The region having a C concentration of ½ or less of the C concentration at the position ½ of the sheet thickness away from the surface was regarded as a decarburized layer, and the thickness thereof was obtained to obtain the thickness of the decarburized layer.

For the measurement, a Marcus type glow discharge optical emission spectrometer (GD-Profiler) manufactured by Horiba Ltd. was used.

In addition, the appearance quality of the simulated components was evaluated by the following method.

The appearance quality was evaluated by the degree of ghost lines generated on the surface of the simulated component after forming. The surface after press forming was rubbed with grinding stone, and stripes generated on the surface at intervals on the order of several mm were determined as ghost lines and graded from 1 to 5 according to the degree of the occurrence of the stripe patterns. An arbitrary region of 100 mm×100 mm was visually confirmed, and a case where no stripe patterns were confirmed was evaluated as "1". A case where the maximum stripe pattern length was 20 mm or less was evaluated as "2", a case where the maximum stripe pattern length was greater than 20 mm and 50 mm or less was evaluated as "3", a case where the maximum stripe pattern length was greater than 50 mm and 70 mm or less was evaluated as "4", and a case where the maximum stripe pattern length was greater than 70 mm was evaluated as "5". In a case where the evaluation was "3" or lower, the simulated component was determined to have excellent appearance quality and be acceptable. Meanwhile, in a case where the evaluation was "4" or higher, the simulated component was determined to be inferior in appearance quality and be unacceptable.

Furthermore, the appearance quality was more strictly evaluated by "Wz, which is the sum of a maximum peak height Zp and a maximum valley depth Zv of a waviness curve". The waviness curve of the surface of a press-formed article (a simulated component) was obtained in accordance with JIS B 0601: 2013 by the same method as when the arithmetic average waviness Wa was obtained. The maximum peak height Zp and the maximum valley depth Zv were obtained from the waviness curve, and Wz was obtained by calculating the sum of these values. In a case where the obtained Wz was 0.40 μm or less, the appearance quality was determined to be more excellent.

TABLE 1

| Steel | Chemical Composition (mass %) with Remainder Consisting of Fe and Impurities | | | | | | | | | | | | |
|---|---|---|---|---|---|---|---|---|---|---|---|---|---|
| | C | Mn | Si | P | S | Al | N | O | Cr | Mo | B | Ti | Others |
| A1 | 0.052 | 1.88 | 0.015 | 0.018 | 0.0018 | 0.297 | 0.0035 | 0.0009 | | | | | |
| B1 | 0.050 | 1.80 | 0.013 | 0.020 | 0.0011 | 0.300 | 0.0038 | 0.0013 | 0.39 | 0.07 | 0.0018 | 0.010 | |
| C1 | 0.053 | 1.81 | 0.010 | 0.036 | 0.0026 | 0.036 | 0.0045 | 0.0010 | 0.40 | 0.07 | 0.0020 | 0.012 | |
| D1 | 0.059 | 1.50 | 0.013 | 0.020 | 0.0017 | 0.300 | 0.0035 | 0.0019 | 0.36 | 0.07 | 0.0015 | 0.010 | |
| E1 | 0.061 | 1.80 | 0.012 | 0.018 | 0.0016 | 0.307 | 0.0039 | 0.0015 | 0.40 | 0.07 | 0.0015 | 0.010 | |
| F1 | 0.060 | 1.89 | 0.015 | 0.025 | 0.0020 | 0.034 | 0.0031 | 0.0009 | | 0.07 | 0.0016 | 0.010 | |
| G1 | 0.060 | 1.80 | 0.010 | 0.020 | 0.0021 | 0.035 | 0.0044 | 0.0009 | 0.10 | 0.02 | 0.0014 | 0.015 | |
| H1 | 0.060 | 2.16 | 0.011 | 0.020 | 0.0013 | 0.303 | 0.0048 | 0.0019 | 0.40 | 0.07 | 0.0021 | 0.010 | |
| I1 | 0.072 | 1.80 | 0.012 | 0.022 | 0.0017 | 0.300 | 0.0035 | 0.0015 | 0.42 | 0.07 | | | |
| J1 | 0.081 | 1.25 | 0.010 | 0.020 | 0.0014 | 0.296 | 0.0035 | 0.0012 | 0.40 | 0.12 | | | |
| K1 | 0.080 | 2.05 | 0.450 | 0.019 | 0.0020 | 0.050 | 0.0036 | 0.0013 | | | | | |
| L1 | 0.110 | 1.30 | 0.010 | 0.020 | 0.0028 | 0.030 | 0.0035 | 0.0015 | 0.40 | 0.10 | 0.0015 | 0.020 | Nb: 0.005, Sb: 0.005 |
| M1 | 0.061 | 1.70 | 0.102 | 0.016 | 0.0026 | 0.033 | 0.0030 | 0.0014 | 0.55 | 0.07 | 0.0015 | 0.020 | |
| N1 | 0.060 | 1.71 | 0.105 | 0.020 | 0.0033 | 0.030 | 0.0033 | 0.0015 | 0.55 | 0.07 | 0.0018 | 0.015 | V: 0.01, REM: 0.0017 |
| O1 | 0.059 | 1.68 | 0.103 | 0.022 | 0.0025 | 0.037 | 0.0037 | 0.0015 | 0.55 | 0.07 | 0.0019 | 0.010 | W: 0.03, Cu: 0.05 |
| P1 | 0.060 | 1.70 | 0.010 | 0.024 | 0.0020 | 0.029 | 0.0035 | 0.0015 | 0.55 | 0.07 | 0.0015 | 0.040 | Ni: 0.05, Sn: 0.08 |
| Q1 | 0.030 | 1.80 | 0.014 | 0.020 | 0.0020 | 0.301 | 0.0033 | 0.0013 | 0.40 | 0.07 | 0.0015 | 0.013 | |
| R1 | 0.052 | 0.90 | 0.009 | 0.021 | 0.0018 | 0.034 | 0.0041 | 0.0009 | 0.40 | 0.08 | 0.0020 | 0.010 | |
| S1 | 0.060 | 1.72 | 0.152 | 0.020 | 0.0028 | 0.054 | 0.0042 | 0.0015 | 0.55 | 0.07 | 0.0020 | 0.011 | Zr: 0.001, REM: 0.002 |
| T1 | 0.060 | 1.70 | 0.152 | 0.015 | 0.0021 | 0.051 | 0.0038 | 0.0015 | 0.53 | 0.07 | 0.0017 | 0.010 | Mg: 0.0029 |
| U1 | 0.062 | 1.73 | 0.153 | 0.020 | 0.0024 | 0.057 | 0.0035 | 0.0015 | 0.55 | 0.07 | 0.0015 | 0.010 | Ca: 0.0016, REM: 0.0014 |

TABLE 2

| Steel Sheet No. | Steel | Manufacturing Conditions | | | | | | Steel Sheet | | | Plating Type | Tensile Strength (MPa) | Press-Formed Article | |
|---|---|---|---|---|---|---|---|---|---|---|---|---|---|---|
| | | (I) | (II) | (III) | (IV) | (V) | (VI) | Thickness of Decarburized Layer (μm) | Arithmetic Average Waviness Wa (μm) | (3σ/μ) × 100 | | | Appearance Evaluation | Wz (μm) |
| 1 | A1 | OK | OK | OK | OK | NG | NG | 0 | 0.15 | 8.7 | None | 543 | 3 | 0.41 |
| 2 | A1 | OK | OK | OK | OK | OK | NG | 0 | 0.16 | 5.8 | None | 536 | 2 | 0.34 |
| 3 | B1 | OK | OK | OK | OK | NG | NG | 0 | 0.12 | 8.6 | GA | 603 | 3 | 0.52 |
| 4 | C1 | OK | OK | OK | OK | NG | NG | 10 | 0.16 | 7.8 | GA | 595 | 3 | 0.52 |
| 5 | D1 | OK | OK | OK | OK | NG | OK | 35 | 0.19 | 7.1 | GA | 575 | 2 | 0.53 |
| 6 | E1 | OK | OK | OK | OK | NG | NG | 0 | 0.13 | 7.8 | GA | 618 | 3 | 0.51 |
| 7 | E1 | OK | OK | OK | OK | OK | NG | 0 | 0.14 | 6.0 | GA | 612 | 2 | 0.37 |
| 8 | E1 | NG | OK | OK | OK | NG | NG | 15 | 0.07 | 8.1 | GA | 615 | 5 | 0.51 |
| 9 | E1 | OK | NG | OK | OK | NG | NG | 0 | 0.09 | 8.3 | GA | 614 | 4 | 0.53 |
| 10 | E1 | OK | OK | NG | OK | NG | NG | 0 | 0.08 | 7.9 | GA | 618 | 5 | 0.50 |
| 11 | E1 | OK | OK | OK | NG | NG | NG | 0 | 0.31 | 8.0 | GA | 616 | Inferior in Appearance Before Forming | 0.78 |
| 12 | E1 | NG | NG | OK | OK | NG | OK | 22 | 0.08 | 8.2 | GA | 620 | 5 | 0.54 |
| 13 | E1 | OK | OK | NG | NG | NG | NG | 0 | 0.33 | 8.0 | GA | 608 | Inferior in Appearance Before Forming | 0.81 |
| 14 | F1 | OK | OK | OK | OK | NG | NG | 0 | 0.16 | 10.1 | GA | 590 | 3 | 0.55 |
| 15 | F1 | OK | OK | OK | OK | OK | NG | 0 | 0.17 | 6.3 | GA | 581 | 3 | 0.37 |
| 16 | G1 | OK | OK | OK | OK | NG | OK | 32 | 0.13 | 8.1 | GA | 595 | 2 | 0.52 |
| 17 | H1 | OK | OK | OK | OK | NG | NG | 0 | 0.15 | 12.5 | GA | 623 | 5 | 0.63 |
| 18 | I1 | OK | OK | OK | OK | NG | NG | 12 | 0.17 | 8.9 | GA | 645 | 3 | 0.53 |
| 19 | I1 | OK | OK | OK | OK | OK | NG | 15 | 0.16 | 6.4 | GA | 611 | 2 | 0.38 |
| 20 | J1 | OK | OK | OK | OK | NG | NG | 0 | 0.19 | 10.3 | GA | 645 | 3 | 0.54 |
| 21 | J1 | OK | OK | OK | OK | OK | NG | 0 | 0.14 | 6.1 | EG | 622 | 2 | 0.38 |
| 22 | K1 | OK | OK | OK | OK | NG | OK | 35 | 0.20 | 10.4 | GA | 666 | 5 | 0.66 |
| 23 | L1 | OK | OK | OK | OK | NG | NG | 18 | 0.18 | 11.4 | GA | 618 | 5 | 0.68 |
| 24 | M1 | OK | OK | OK | OK | NG | NG | 0 | 0.15 | 7.9 | GA | 621 | 3 | 0.53 |
| 25 | M1 | OK | NG | NG | OK | NG | NG | 0 | 0.07 | 8.2 | GA | 615 | 4 | 0.49 |
| 26 | N1 | OK | OK | OK | OK | NG | OK | 25 | 0.19 | 7.5 | GA | 673 | 2 | 0.52 |

TABLE 2-continued

| Steel Sheet No. | Steel | Manufacturing Conditions (I) | (II) | (III) | (IV) | (V) | (VI) | Thickness of Decarburized Layer (μm) | Arithmetic Average Waviness Wa (μm) | (3σ/μ) × 100 | Plating Type | Tensile Strength (MPa) | Press-Formed Article Appearance Evaluation | Wz (μm) |
|---|---|---|---|---|---|---|---|---|---|---|---|---|---|---|
| 27 | O1 | OK | OK | OK | OK | NG | NG | 0 | 0.15 | 7.4 | GI | 635 | 3 | 0.53 |
| 28 | P1 | OK | OK | OK | OK | NG | NG | 0 | 0.11 | 8.0 | GA | 621 | 3 | 0.54 |
| 29 | Q1 | OK | OK | OK | OK | NG | NG | 0 | 0.15 | 7.9 | GA | 483 | 3 | 0.42 |
| 30 | R1 | OK | OK | OK | OK | NG | NG | 0 | 0.12 | 7.8 | GA | 465 | 3 | 0.43 |
| 31 | S1 | OK | OK | OK | OK | NG | OK | 52 | 0.22 | 7.2 | GA | 587 | 2 | 0.52 |
| 32 | T1 | OK | OK | OK | OK | NG | NG | 0 | 0.12 | 7.8 | GA | 630 | 3 | 0.51 |
| 33 | U1 | OK | OK | OK | OK | OK | NG | 0 | 0.17 | 6.3 | None | 603 | 3 | 0.38 |

Referring to Table 2, it was found that the press-formed articles using a blank sheet, in which a base steel sheet contains, as a chemical composition, by mass %, C: 0.040% to 0.100%, Mn: 1.00% to 2.00%, Si: 0.005% to 1.500%, P: 0.100% or less, S: 0.0200% or less, Al: 0.005% to 0.700%, N: 0.0150% or less, O: 0.0100% or less, Cr: 0% to 0.80%, Mo: 0% to 0.16%, B: 0% to 0.0100%, Ti: 0% to 0.100%, Nb: 0% to 0.060%. V: 0% to 0.50%, Ni: 0% to 1.00%, Cu: 0% to 1.00%, W: 0% to 1.00%, Sn: 0% to 1.00%, Sb: 0% to 0.200%, Ca: 0% to 0.0100%, Mg: 0% to 0.0100%, Zr: 0% to 0.0100%, REM: 0% to 0.0100%, and a remainder: Fe and impurities, and arithmetic average waviness Wa is 0.10 to 0.30 μm, have a high strength and excellent appearance quality. In addition, it was found that the blank sheet has a high strength and a press-formed article having excellent appearance quality can be manufactured using the blank sheet.

Example 2

Steels having a chemical composition shown in Table 3 were melted and continuously cast to manufacture slabs having a thickness of 240 to 300 mm. The obtained slabs were heated in a temperature range of 1,100° C. or higher, and then hot-rolled. After hot rolling, the slabs were wound, subjected to primary annealing under the conditions shown in Table 4, and then pickled. The finish rolling temperature in the hot rolling was set to 900° C. or higher, and the coiling temperature was set to 650° C. or lower. After pickling, cold rolling was performed thereon with a cumulative rolling reduction of 70% to 90%. After cold rolling, secondary annealing was performed under the conditions shown in Table 4, and a hot-dip galvannealed layer (GA), a hot-dip galvanized layer (GI), and an electrogalvanized layer (EG) were formed as necessary. The steel sheets and plated steel sheets shown in Table 2 were obtained by the above-described method. The obtained steel sheets and plated steel sheets had a sheet thickness of 0.2 to 2.0 mm.

After annealing was performed after cold rolling, simulated components were manufactured by press forming using the steel sheets and plated steel sheets (blank sheets). Also in the present example, in the press forming, the material (the steel sheet or plated steel sheet) was actively allowed to flow into a die and punch to perform press forming so that the anisotropy of strain did not occur at any position on the surface of the simulated component. Therefore, also in the present example, the way ghost lines occur in the simulated components does not depend on the direction of the blank sheet.

With respect to the obtained steel sheets, plated steel sheets, and simulated components (press-formed articles), ΔC was obtained by the above-described method. Since ΔC values of the steel sheets and plated steel sheets and ΔC values of the simulated components were the same, the ΔC values of the simulated components are not shown in the tables.

In addition, the tensile strengths of the steel sheets and the appearance quality of the simulated components were evaluated by the following methods. Since there was no significant difference between the tensile strength of the steel sheet and the tensile strength of the simulated component (press-formed article), it was evaluated whether the steel sheet had a desired tensile strength as a door outer.

In addition, the tensile strength and the appearance quality were evaluated by the same methods as in Example 1.

TABLE 3

| | Chemical Composition (mass %) with Remainder Consisting of Fe and Impurities | | | | | | | | | | | | |
|---|---|---|---|---|---|---|---|---|---|---|---|---|---|
| Steel | C | Mn | Si | Al | P | S | N | O | Cr | Mo | Ti | B | Others |
| A2 | 0.082 | 2.05 | 0.450 | 0.035 | 0.020 | 0.0054 | 0.0035 | 0.0009 | | | | | |
| B2 | 0.098 | 1.30 | 0.013 | 0.298 | 0.015 | 0.0014 | 0.0038 | 0.0013 | 0.40 | 0.10 | 0.010 | 0.0015 | |
| C2 | 0.060 | 1.78 | 0.044 | 0.302 | 0.047 | 0.0012 | 0.0045 | 0.0010 | 0.40 | 0.07 | 0.011 | 0.0018 | |
| D2 | 0.100 | 1.28 | 0.011 | 0.300 | 0.021 | 0.0019 | 0.0035 | 0.0019 | 0.39 | 0.10 | | | |
| E2 | 0.115 | 1.30 | 0.056 | 0.293 | 0.020 | 0.0020 | 0.0039 | 0.0015 | 0.41 | 0.10 | | | |
| F2 | 0.030 | 1.82 | 0.423 | 0.054 | 0.020 | 0.0020 | 0.0035 | 0.0009 | | | | | |
| G2 | 0.063 | 2.45 | 0.020 | 0.042 | 0.018 | 0.0010 | 0.0038 | 0.0001 | | | 0.015 | 0.0019 | |
| H2 | 0.080 | 2.02 | 0.411 | 0.050 | 0.020 | 0.0020 | 0.0031 | 0.0009 | | | | | Nb: 0.005, Sb: 0.005 |
| I2 | 0.078 | 2.01 | 0.448 | 0.033 | 0.035 | 0.0034 | 0.0044 | 0.0012 | | | | | V: 0.02, REM: 0.0017 |
| J2 | 0.077 | 2.00 | 0.430 | 0.050 | 0.018 | 0.0024 | 0.0046 | 0.0009 | | | | | W: 0.03, Cu: 0.05 |
| K2 | 0.095 | 1.30 | 0.032 | 0.300 | 0.017 | 0.0020 | 0.0033 | 0.0024 | 0.40 | 0.11 | | | Ni: 0.05, Sn: 0.01 |

TABLE 3-continued

| | Chemical Composition (mass %) with Remainder Consisting of Fe and Impurities | | | | | | | | | | | |
|---|---|---|---|---|---|---|---|---|---|---|---|---|
| Steel | C | Mn | Si | Al | P | S | N | O | Cr | Mo | Ti | B | Others |
| L2 | 0.100 | 1.30 | 0.015 | 0.302 | 0.024 | 0.0018 | 0.0035 | 0.0019 | 0.40 | 0.10 | | | Zr: 0.001, REM: 0.0021 |
| M2 | 0.101 | 1.30 | 0.013 | 0.299 | 0.011 | 0.0041 | 0.0039 | 0.0018 | 0.50 | 0.10 | | | Mg: 0.0019 |
| N2 | 0.099 | 1.30 | 0.021 | 0.288 | 0.020 | 0.0080 | 0.0040 | 0.0019 | 0.70 | 0.10 | | | Ca: 0.0016, REM: 0.0014 |

TABLE 4

| | | Primary Annealing Conditions | | Secondary Annealing Conditions | | | | Steel Sheet | | Press-Formed |
|---|---|---|---|---|---|---|---|---|---|---|
| No. | Steel | Annealing Temperature (°C.) | Annealing Time (h) | Annealing Temperature (°C.) | Dew Point (°C.) | Staying Time in Temperature Range of 700°C. or Higher (sec) | Plating Type | ΔC (mass %/mm) | Tensile Strength (MPa) | Article Appearance Evaluation |
| 34 | A2 | 650 | 6 | 780 | −5 | 210 | GA | 0.68 | 620 | 3 |
| 35 | A2 | 650 | 6 | 783 | −4 | 102 | GA | 0.45 | 640 | 3 |
| 36 | A2 | 640 | 5 | 811 | −30 | 210 | GA | 0.09 | 648 | 5 |
| 37 | A2 | 680 | 9 | 806 | −3 | 32 | GA | 0.08 | 650 | 5 |
| 38 | A2 | 510 | 6 | 791 | −3 | 120 | GA | 0.18 | 632 | 4 |
| 39 | B2 | 630 | 8 | 800 | −5 | 155 | None | 0.85 | 618 | 3 |
| 40 | C2 | 620 | 6 | 783 | −1 | 210 | GA | 0.55 | 601 | 1 |
| 41 | C2 | 620 | 6 | 811 | −3 | 302 | GA | 0.57 | 579 | 2 |
| 42 | C2 | 560 | 2 | 795 | −8 | 145 | GA | 0.24 | 593 | 2 |
| 43 | C2 | 560 | 1 | 797 | −2 | 165 | GA | 0.17 | 605 | 4 |
| 44 | C2 | 600 | 3 | 800 | −14 | 100 | GA | 0.18 | 592 | 4 |
| 45 | C2 | 620 | 6 | 809 | −5 | 45 | GA | 0.12 | 595 | 5 |
| 46 | D2 | 660 | 5 | 815 | −3 | 135 | EG | 0.88 | 598 | 3 |
| 47 | E2 | 650 | 6 | 783 | −5 | 210 | None | 1.12 | 618 | 4 |
| 48 | F2 | 650 | 6 | 795 | −1 | 187 | GA | 0.25 | 488 | 3 |
| 49 | G2 | 650 | 6 | 800 | −4 | 195 | GA | 0.44 | 689 | 5 |
| 50 | H2 | 640 | 7 | 785 | −4 | 200 | GI | 0.61 | 635 | 3 |
| 51 | I2 | 650 | 6 | 790 | −5 | 184 | GA | 0.52 | 625 | 2 |
| 52 | J2 | 630 | 5 | 785 | −6 | 154 | None | 0.55 | 641 | 1 |
| 53 | K2 | 660 | 5 | 800 | −5 | 195 | GA | 0.58 | 615 | 2 |
| 54 | L2 | 620 | 6 | 798 | −3 | 254 | GI | 0.85 | 576 | 3 |
| 55 | L2 | 610 | 4 | 810 | 0 | 485 | GI | 0.98 | 531 | 4 |
| 56 | M2 | 680 | 5 | 805 | −5 | 168 | GA | 0.55 | 608 | 3 |
| 57 | N2 | 650 | 6 | 800 | −4 | 200 | GA | 0.69 | 630 | 2 |
| 58 | N2 | — | — | 820 | −9 | 169 | GA | 0.18 | 668 | 4 |

Referring to Table 4, it was found that the press-formed articles using a blank sheet, in which a base steel sheet contains, as a chemical composition, by mass %, C: 0.040% to 0.105%, Mn: 1.00% to 2.30%. Si: 0.005% to 1.500%, Al: 0.005% to 0.700%. P: 0.100% or less, S: 0.0200% or less, N: 0.0150% or less, O: 0.0100% or less, Cr: 0% to 0.80%, Mo: 0% to 0.16%, Ti: 0% to 0.100%?. B: 0% n to 0.0100%, Nb: 0% to 0.060%, V: 0% to 0.50%, Ni: 0% to 1.00%, Cu: 0% to 1.00%, W: 0% to 1.00%, Sn: 0% to 1.00%, Sb: 0% to 0.200%, Ca: 0% to 0.0100%, Mg: 0% u to 0.0100%, Zr: 0% to 0.0100%. REM: 0% to 0.0100%, and a remainder: Fe and impurities. ΔC calculated from $C_{20}$ that is the C content at a depth position of 20 μm from the surface of the base steel sheet, $C_{60}$ that is the C content at a depth position of 60 μm from the surface of the base steel sheet, and Expression (1) is 0.20 to 0.90 mass %/mm, and a tensile strength is 500 MPa or greater, have a high strength and excellent appearance quality. In addition, it was found that the blank sheet has a high strength and a press-formed article having excellent appearance quality can be manufactured.

INDUSTRIAL APPLICABILITY

According to the aspect of the present invention, it is possible to provide an outer plate component for an automobile in which ghost lines are reduced, a blank sheet in which ghost lines occurring by press forming can be reduced, a manufacturing method for the blank sheet, and a manufacturing facility for the blank sheet.

BRIEF DESCRIPTION OF THE REFERENCE SYMBOLS

10 feeding device
20 blanking device
30 accommodating device

What is claimed is:
1. A blank sheet which is a material for an outer plate component for an automobile, the blank sheet comprising:
a steel sheet, wherein a rolling direction of the steel sheet extends along a longitudinal direction of the blank sheet, and
a thickness is 0.6 mm or less, wherein the steel sheet contains, as a chemical composition, by mass %,
C: 0.040% to 0.100%,
Mn: 1.00% to 2.00%,
Si: 0.005% to 1.500%,
P: 0.100% or less,
S: 0.0200% or less,
Al: 0.005% to 0.700%,
N: 0.0150% or less,
O: 0.0100% or less,
Cr: 0% to 0.80%,
Mo: 0% to 0.16%,
B: 0% to 0.0100%,
Ti: 0% to 0.100%,
Nb: 0% to 0.060%,
V: 0% to 0.50%,
Ni: 0% to 1.00%,
Cu: 0% to 1.00%,
W: 0% to 1.00%,
Sn: 0% to 1.00%,
Sb: 0% to 0.200%,
Ca: 0% to 0.0100%,
Mg: 0% to 0.0100%,
Zr: 0% to 0.0100%,
REM: 0% to 0.0100%, and
a remainder: Fe and impurities, and
arithmetic average waviness Wa is 0.10 to 0.30 μm.

2. A blank sheet which is a material for an outer plate component for an automobile, the blank sheet comprising:
a steel sheet,
wherein a rolling direction of the steel sheet extends along a longitudinal direction of the blank sheet, and
a thickness is 0.6 mm or less,
wherein the steel sheet contains, as a chemical composition, by mass %,
C: 0.040% to 0.105%,
Mn: 1.00% to 2.30%,
Si: 0.005% to 1.500%,
Al: 0.005% to 0.700%,
P: 0.100% or less,
S: 0.0200% or less,
N: 0.0150% or less,
O: 0.0100% or less,
Cr: 0% to 0.80%,
Mo: 0% to 0.16%,
Ti: 0% to 0.100%,
B: 0% to 0.0100%,
Nb: 0% to 0.060%,
V: 0% to 0.50%,
Ni: 0% to 1.00%,
Cu: 0% to 1.00%,
W: 0% to 1.00%,
Sn: 0% to 1.00%,
Sb: 0% to 0.200%,
Ca: 0% to 0.0100%,
Mg: 0% to 0.0100%,
Zr: 0% to 0.0100%,
REM: 0% to 0.0100%, and
a remainder: Fe and impurities,
ΔC calculated from $C_{20}$ that is a C content at a depth position of 20 μm from a surface, $C_{60}$ that is a C content at a depth position of 60 μm from the surface, and Expression (1) is 0.20 to 0.90 mass %/mm, and
a tensile strength is 500 MPa or greater, $$\Delta C = (C_{60} - C_{20})/(0.04) \qquad (1).$$

* * * * *